United States Patent
Nakajima

(10) Patent No.: US 7,148,886 B2
(45) Date of Patent: Dec. 12, 2006

(54) POWER SUPPLY VOLTAGE CONVERTING CIRCUIT, CONTROL METHOD THEREOF, DISPLAY APPARATUS, AND PORTABLE TERMINAL

(75) Inventor: Yoshiharu Nakajima, Kanagawa (JP)

(73) Assignee: Sony Corporation (JP)

( * ) Notice: Subject to any disclaimer, the term of this patent is extended or adjusted under 35 U.S.C. 154(b) by 89 days.

(21) Appl. No.: 11/109,644

(22) Filed: Apr. 20, 2005

(65) Prior Publication Data
US 2005/0184942 A1 Aug. 25, 2005

Related U.S. Application Data

(62) Division of application No. 10/182,873, filed as application No. PCT/JP01/10694 on Dec. 6, 2001.

(30) Foreign Application Priority Data

| Dec. 6, 2000 | (JP) | ............................. 2000-371045 |
| Dec. 7, 2000 | (JP) | ............................. 2000-372351 |
| Dec. 7, 2000 | (JP) | ............................. 2000-372352 |
| Dec. 7, 2000 | (JP) | ............................. 2000-372353 |

(51) Int. Cl.
*G09G 5/00* (2006.01)
(52) U.S. Cl. ...................................... 345/211; 345/204
(58) Field of Classification Search .......... 345/87–100, 345/204, 211–215; 327/536, 537, 589; 365/189.09, 365/203, 226, 189.11
See application file for complete search history.

(56) References Cited

U.S. PATENT DOCUMENTS 5,038,325 A * 8/1991 Douglas et al. ............. 327/536
5,677,649 A * 10/1997 Martin ......................... 331/57
5,841,725 A * 11/1998 Kang et al. .................. 327/536
6,177,828 B1 * 1/2001 Kang et al. .................. 327/536
6,509,894 B1 * 1/2003 Maekawa et al. ........... 345/211
2003/0011586 A1 * 1/2003 Nakajima .................... 345/211
2005/0184943 A1 * 8/2005 Nakajima .................... 345/87

FOREIGN PATENT DOCUMENTS

| JP | 1-110758 | 4/1989 |
| JP | 7-73669 | 3/1995 |
| JP | 7-322605 | 12/1995 |

\* cited by examiner

*Primary Examiner*—Bipin Shalwala
*Assistant Examiner*—David L. Lewis
(74) *Attorney, Agent, or Firm*—Rader, Fishman & Grauer PLLC; Ronald P. Kananen

(57) ABSTRACT

In a power supply voltage converting circuit using a charge pump circuit having a switch device (Nch MOS transistor Qn(12) and Pch MOS transistor Qp(12)) in an output unit, a first clamp circuit (13) diode-clamps a switching pulse voltage (control pulse voltage) for the switch device at the time of starting the power supply voltage converting circuit, and a second clamp circuit (16) clamps the switching pulse voltage at a ground level (negative side circuit power supply potential) on the basis of a clamp pulse obtained by using an output voltage Vout at the time of an end of the starting process. A sufficient driving voltage is thereby provided for the Pch MOS transistor Qp(12) in particular. Thus, a power supply voltage converting circuit that can obtain a high current capacity on a small-area circuit scale, a control method thereof, a display apparatus having the power supply voltage converting circuit as a power supply circuit, and a portable terminal having the display apparatus are provided.

4 Claims, 21 Drawing Sheets

MINIMUM Vout =Vc=-VCC+Vth(D101)+Vth(D102)

MAXIMUM Vout =Vc=2×VCC-Vth(D101)-Vth(D102)

US 7,148,886 B2

POWER SUPPLY VOLTAGE CONVERTING CIRCUIT, CONTROL METHOD THEREOF, DISPLAY APPARATUS, AND PORTABLE TERMINAL

This application is a divisional application of U.S. patent application Ser. No. 10/182,873 filed Aug. 1, 2002 which is a national stage 371 of PCT/JP01/10694, filed Dec. 6, 2001, the entire content being incorporated by reference.

TECHNICAL FIELD

The present invention relates to a power supply voltage converting circuit, a control method thereof, a display apparatus, and a portable terminal, and particularly to a power supply voltage converting circuit using a charge pump circuit, a control method thereof, a display apparatus having the power supply voltage converting circuit as a power supply circuit, and a portable terminal having the display apparatus.

BACKGROUND ART

Portable terminals such as portable telephones and PDAs (Personal Digital Assistants) have recently spread remarkably. A factor in the rapid spread of these portable terminals is a liquid crystal display apparatus mounted as an output display unit of the portable terminals. The reason is that in principle, the liquid crystal display apparatus has a characteristic of not requiring much power for driving the liquid crystal display apparatus and is therefore a display device of low power consumption.

A portable terminal uses a single power supply voltage battery as a power supply. On the other hand, a logic unit and an analog unit of a horizontal driving circuit for writing information to each of plural pixels arranged in a matrix manner through a signal line in the liquid crystal display apparatus use different direct-current voltages. A vertical driving circuit for selecting the pixels by a unit of a row uses a direct-current voltage of a greater absolute value than the horizontal driving circuit. Accordingly, the liquid crystal display apparatus mounted in the portable terminal uses a power supply voltage converting circuit, or a so-called DC-to-DC converter (hereinafter described as a DD converter) for converting a single direct-current voltage into a plurality of direct-current voltages of different voltage values.

A conventional DD converter in a liquid crystal display apparatus generally uses an inductor L. However, with a recent reduction in power consumption and size of portable terminals, DD converters of a charge pump type have often been used. Although a charge pump type DD converter has a relatively low current capacity, the charge pump type DD converter does not require use of the inductor L as an external component. The charge pump type DD converter therefore has an advantage of being able to contribute to reducing the size of the portable terminal.

FIG. 1 shows a configuration of a charge pump type DD converter of a negative voltage generating type according to a first conventional example.

In FIG. 1, a Pch MOS transistor Qp101 and an Nch MOS transistor Qn101 are connected in series with each other between a power supply for supplying a single direct-current voltage VCC and a ground (GND). The Pch MOS transistor Qp101 and the Nch MOS transistor Qn101 have gates connected to a common point, thus forming a CMOS inverter 101. A pulse generating source 102 applies a switching pulse of a predetermined frequency to the gate common connection point of the CMOS inverter 101.

A drain common connection point (node A) of the CMOS inverter 101 is connected with one end of a capacitor C101. Another end of the capacitor C101 is connected with an anode of a diode D101 and a cathode of a diode D102. A cathode of the diode D101 is grounded. A load capacitor C102 is connected between an anode of the diode D102 and the ground.

In the thus formed DD converter of the negative voltage generating type, the power supply voltage VCC multiplied by −1, that is, a negative direct-current voltage −VCC is derived across the load capacitor C102 in principle.

FIG. 2 shows a configuration of a charge pump type DD converter of a voltage raising type according to the first conventional example. Fundamental configuration of the charge pump type DD converter of the voltage raising type is the same as that of the charge pump type DD converter of the negative voltage generating type. Specifically, in FIG. 2, the DD converter of the voltage raising type is different from the DD converter of the negative voltage generating type of FIG. 1 only in that a diode D101 is connected between another end of a capacitor C101 and a power supply (VCC). In the DD converter of the voltage raising type, twice the power supply voltage VCC, that is, a direct-current voltage 2×VCC is derived across a load capacitor C102 in principle.

However, since the thus formed charge pump type DD converters according to the first conventional example use clamping by the diode D101, an output voltage Vout does not reach the voltage value of the power supply voltage VCC multiplied by −1 or 2 even under no load, and is shifted by twice a threshold voltage Vth of the diode, as is clear from timing charts of FIG. 3 and FIG. 4. The timing charts of FIG. 3 and FIG. 4 show signal waveforms A to C at nodes A to C, respectively, in the circuits of FIG. 1 and FIG. 2, respectively.

The problem of the first conventional example has been improved by charge pump type DD converters according to a second conventional example as shown in FIG. 5 and FIG. 6. In FIG. 5 and FIG. 6, the same parts as in FIG. 1 and FIG. 2 are identified by the same reference numerals. FIG. 5 shows the DD converter of a negative voltage generating type, while FIG. 6 shows the DD converter of a voltage raising type. Fundamental configurations of the two DD converters are the same.

The DD converter of the negative voltage generating type will first be described. In FIG. 5, another end of a capacitor C101 is connected with a drain of an Nch MOS transistor Qn102 and a source of a Pch MOS transistor Qp102. A load capacitor C102 is connected between a source of the Nch MOS transistor Qn102 and a ground. A drain of the Pch MOS transistor Qp102 is grounded.

A gate common connection point of a CMOS inverter 101 is connected with one end of a capacitor C103. Another end of the capacitor C103 is connected with an anode of a diode D101 and gates of the Nch MOS transistor Qn102 and the Pch MOS transistor Qp102. A cathode of the diode D101 is grounded.

In the thus formed DD converter of the negative voltage generating type, an output voltage Vout reaches the voltage value of a power supply voltage VCC multiplied by −1 at no load, as is clear from a timing chart of FIG. 7.

On the other hand, the DD converter of the voltage raising type shown in FIG. 6 is different from the DD converter of the negative voltage generating type shown in FIG. 5 only in that switching transistors Qp103 and Qn103 are of an opposite conduction type; and a diode D101 is connected between another end of a capacitor C101 and a power supply (VCC). In the DD converter of the voltage raising type, an output voltage Vout reaches the voltage value of twice a power supply voltage VCC at no load.

The timing chart of FIG. 7 and a timing chart of FIG. 8 show signal waveforms A to C at nodes A to C, respectively, in the circuits of FIG. 5 and FIG. 6, respectively.

However, the thus formed charge pump type DD converter according to the second conventional example clamps switching pulse voltage for the switching transistors (MOS transistors Qn102 and Qp102), that is, voltage level of a node D at a voltage value resulting from a shift by a threshold voltage Vth of the diode D101. Therefore, a sufficient driving voltage may not be provided for the switching transistors, particularly the Pch MOS transistor Qp102.

Thus, transistor size of the Pch MOS transistor Qp102 needs to be set large. The increase in the transistor size results in a problem such as an increase in circuit area or a decrease in current capacity. In addition, when pumping operation is stopped temporarily in a power saving mode or the like, the clamped level of the switching pulse voltage is varied with a change in a duty ratio of the switching pulse. This results in a problem such as a decrease in current capacity.

The above problem becomes serious both when a threshold value Vth of the transistor is great and when variation in the threshold value Vth is great. When a circuit is formed on a glass substrate by using thin film transistors (TFTs), for example, the problem is an important consideration. It is known that amorphous silicon and polysilicon used to form the thin film transistors have inferior crystallinity and inferior controllability of the conducting mechanism to single-crystal silicon, and thus the formed thin film transistors have great variations in characteristics.

It is accordingly an object of the present invention to provide a power supply voltage converting circuit that can obtain a high current capacity on a small-area circuit scale, a control method thereof, a display apparatus having the power supply voltage converting circuit as a power supply circuit, and a portable terminal having the display apparatus.

DISCLOSURE OF INVENTION

In order to achieve the above object, according to the present invention, there is provided a power supply voltage converting circuit using a charge pump circuit having a switch device in an output unit, the power supply voltage converting circuit including: a first clamp circuit for diode-clamping a control pulse voltage for the switch device at the time of a start; and a second clamp circuit for clamping the control pulse voltage at a circuit power supply potential at the time of an end of the start process. The power supply voltage converting circuit is used as a power supply circuit of a display apparatus. The display apparatus including the power supply voltage converting circuit is used as a display unit of a portable terminal.

In the thus formed power supply voltage converting circuit, the first clamp circuit diode-clamps the control pulse voltage at the time of a start (at the time of turning on power), whereby the voltage value of the control pulse voltage is clamped at a potential resulting from a shift by a threshold voltage of the diode from the circuit power supply potential. The switch device in the output unit operates on the basis of the control pulse, whereby an output voltage is derived. At the time of an end of the start process, the voltage value of the control pulse voltage is clamped at the circuit power supply potential. Thus, in subsequent pumping operation of the charge pump circuit, a sufficient driving voltage is provided for the switch device.

BEST MODE FOR CARRYING OUT THE INVENTION

Figure 9:
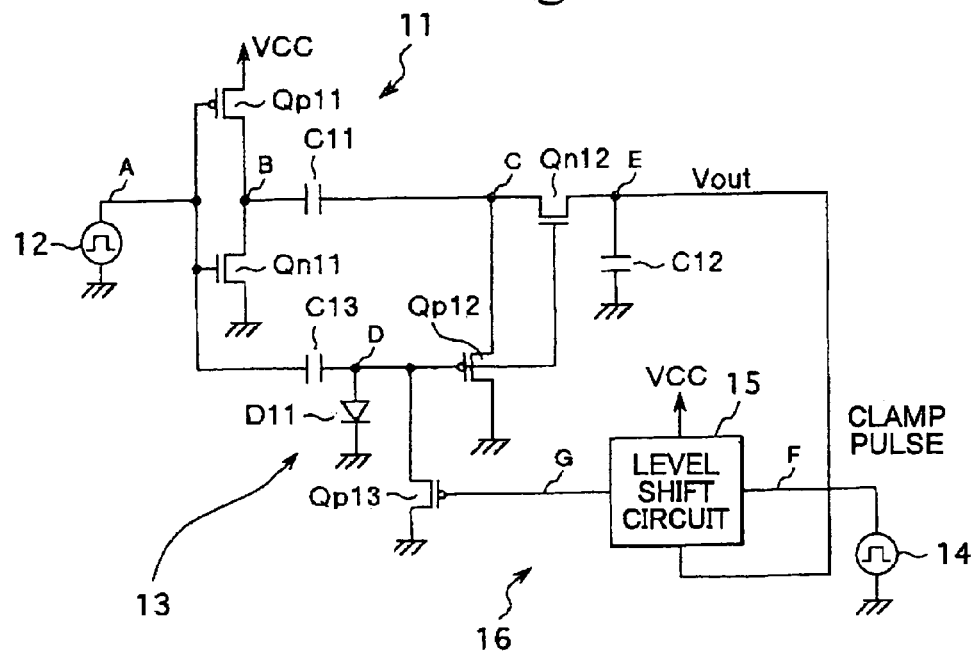
FIG. 9 is a circuit diagram showing an example of configuration of a charge pump type DD converter of the negative voltage generating type according to an embodiment of the present invention.

Preferred embodiments of the present invention will hereinafter be described in detail with reference to the drawings. FIG. 9 is a circuit diagram showing an example of a configuration of a charge pump type DD converter of a negative voltage generating type, which converter is a power supply voltage converting circuit according to an embodiment of the present invention.

In FIG. 9, a Pch MOS transistor Qp11 and an Nch MOS transistor Qn11 are connected in series with each other between a power supply for supplying a single direct-current power supply voltage VCC and a ground (GND). The Pch MOS transistor Qp11 and the Nch MOS transistor Qn11 have gates connected to a common point, thus forming a CMOS inverter 11. A pulse generating source 12 applies a switching pulse of a predetermined frequency to the gate common connection point of the CMOS inverter 11.

A drain common connection point (node B) of the CMOS inverter 11 is connected with one end of a capacitor C11. Another end of the capacitor C11 is connected with a switch device, for example a drain of an Nch MOS transistor Qn12 and a source of a P MOS transistor Qp12. A load capacitor C12 is connected between a source of the Nch MOS transistor Qn12 and the ground.

The gate common connection point of the CMOS inverter 11 is connected with one end of a capacitor C13. Another end of the capacitor C13 is connected with an anode of a diode D11. The diode D11 has a cathode grounded, and thus forms a first clamp circuit 13. The other end of the capacitor C13 is also connected with gates of the Nch MOS transistor Qn12 and the Pch MOS transistor Qp12. A drain of the Pch MOS transistor Qp12 is grounded.

A Pch MOS transistor Qp13 is connected between the other end of the capacitor C13 and the ground. A gate of the Pch MOS transistor Qp13 is supplied with a clamp pulse generated by a pulse generating source 14 and shifted in level by a level shift circuit 15. The Pch MOS transistor Qp13, the pulse generating source 14, and the level shift circuit 15 form a second clamp circuit 16 for clamping a switching pulse voltage for the switching transistors (Nch MOS transistor Qn12 and Pch MOS transistor Qp12).

The level shift circuit 15 in the second clamp circuit 16 uses the power supply voltage VCC inputted to the DD converter as a positive side circuit power supply and an output voltage Vout of the present circuit derived from across the load capacitor C12 as a negative side circuit power supply. The level shift circuit 15 shifts level of the clamp pulse of a first amplitude (VCC–0 [V]) generated by the pulse generating source 14 to that of a clamp pulse of a second amplitude (VCC–Vout [V]), and then supplies the clamp pulse to the gate of the Pch MOS transistor Qp13. Thus, the Pch MOS transistor Qp13 performs switching operation more reliably.

Figure 10:
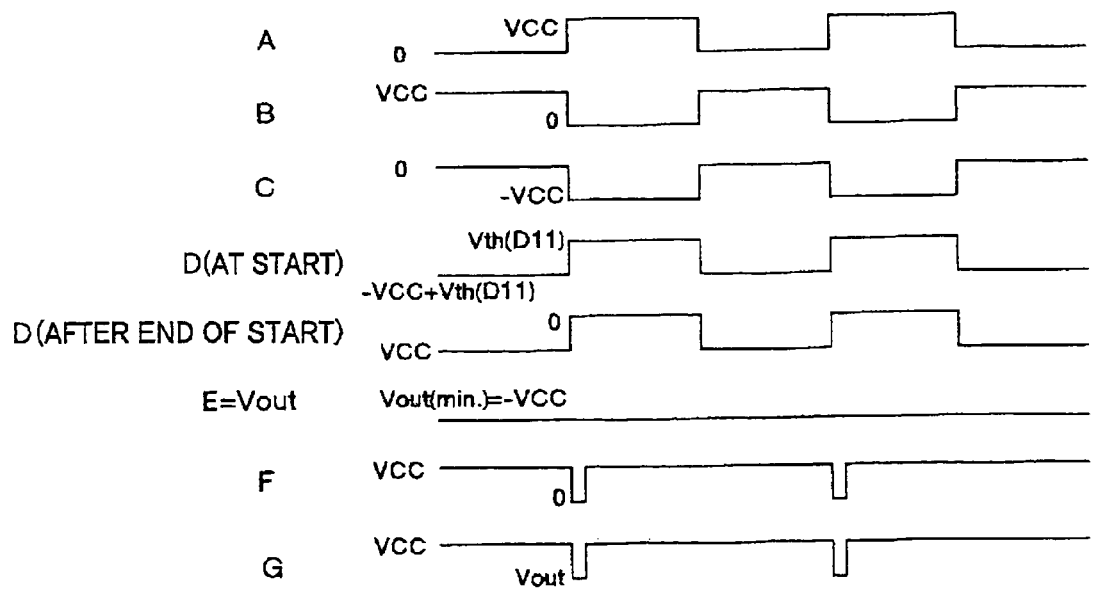
FIG. 10 is a timing chart of assistance in explaining circuit operation of the charge pump type DD converter of the negative voltage generating type according to the embodiment of the present invention.

Circuit operation of the thus formed charge pump type DD converter of the negative voltage generating type will next be described with reference to a timing chart of FIG. 10. Waveforms A to G in the timing chart represent signal waveforms at nodes A to G, respectively, in the circuit of FIG. 9.

At the time of turning on power (at the time of a start), the diode D11 first "H"-level-clamps an output potential of the capacitor C13, that is, a potential of the node D based on the switching pulse generated by the pulse generating source 12 to a potential obtained by a level shift by a threshold voltage Vth of the diode D11 from a ground (GND) level, or a potential of a negative side circuit power supply.

When the switching pulse is at an "L" level (0 V), the Pch MOS transistors Qp11 and Qp12 are in an on state, and therefore the capacitor C11 is charged. In this case, the Nch MOS transistor Qn11 is in an off state, and therefore a potential of the node B is at the VCC level. Then, when the switching pulse is at an "H" level (VCC), the Nch MOS transistors Qn11 and Qn12 are in an on state, and the potential of the node B is at the ground level (0 V), so that a potential of the node C is at a –VCC level. The potential of the node C is passed through the Nch MOS transistor Qn12 as it is, and then becomes the output voltage Vout (=–VCC).

Next, when the output voltage Vout rises to a certain degree (at the time of an end of the starting process), the level shift circuit 15 for the clamp pulse begins to operate. When the level shift circuit 15 begins to operate, the level shift circuit 15 shifts level of the clamp pulse of the amplitude VCC–0 [V] generated by the pulse generating source 14 to that of a clamp pulse of the amplitude VCC–Vout [V], and thereafter applies the clamp pulse to the gate of the Pch MOS transistor Qp13.

In this case, since the "L" level of the clamp pulse is the output voltage Vout, that is, –VCC, the Pch MOS transistor Qp13 is reliably brought into an on state. Thus, the potential of the node D is clamped at the ground level (negative side circuit power supply potential) rather than the potential obtained by the level shift by the threshold voltage Vth of the diode D11 from the ground level. Thus, in subsequent pumping operation, a sufficient driving voltage is provided for the Pch MOS transistor Qp12 in particular.

As described above, the control pulse (switching pulse) voltage for the switch device (Nch MOS transistor Qn12 and Pch MOS transistor Qp12) provided in the output unit of the DD converter using a charge pump circuit is clamped in two separate stages, for example first clamped by the diode D11 of the first clamp circuit 13 at the time of starting the present circuit and then clamped by the second clamp circuit 16 after the end of the starting process. Thereby, a sufficient driving voltage can be provided for the Pch MOS transistor Qp12 in particular.

Thus, since a sufficient switching current is obtained in the Pch MOS transistor Qp12, it is possible to perform stable DC-to-DC conversion operation and improve conversion efficiency. In particular, since a sufficient switching current is obtained without increasing transistor size of the Pch MOS transistor Qp12, it is possible to realize a DD converter having a high current capacity on a small-area circuit scale. Its effect is especially great when a transistor with a high threshold value Vth, for example a thin film transistor is used.

Figure 11:
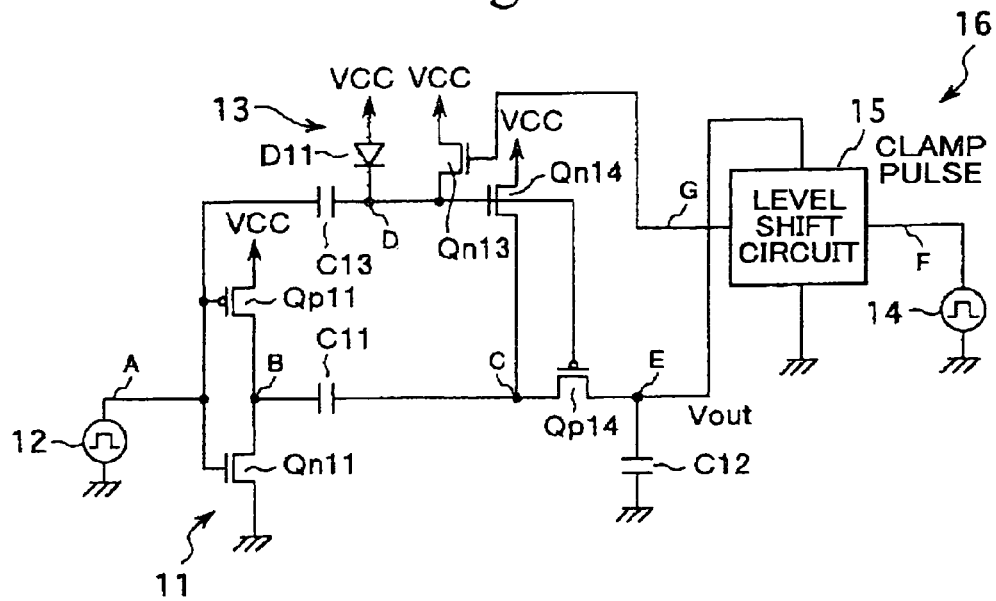
FIG. 11 is a circuit diagram showing an example of configuration of a charge pump type DD converter of the voltage raising type according to an embodiment of the present invention.

FIG. 11 shows an example of configuration of a charge pump type DD converter of a voltage raising type. Fundamental circuit configuration and circuit operation of the charge pump type DD converter of the voltage raising type are the same as those of the charge pump type DD converter of the negative voltage generating type shown in FIG. 9.

Specifically, in FIG. 11, switching transistors and a second clamp transistor (MOS transistors Qp14, Qn14, and Qn13) are of an opposite conduction type from the MOS transistors Qn12, Qp12, and Qp13 in the circuit of FIG. 9; a diode D11 is connected between another end of a capacitor C11 and a power supply (VCC); and a level shift circuit 15 is configured to use an output voltage Vout of the present circuit as a positive side circuit power supply and a ground level as a negative side circuit power supply. The circuit of FIG. 11 is different in configuration from the circuit of FIG. 9 only in that respect.

Figure 12:
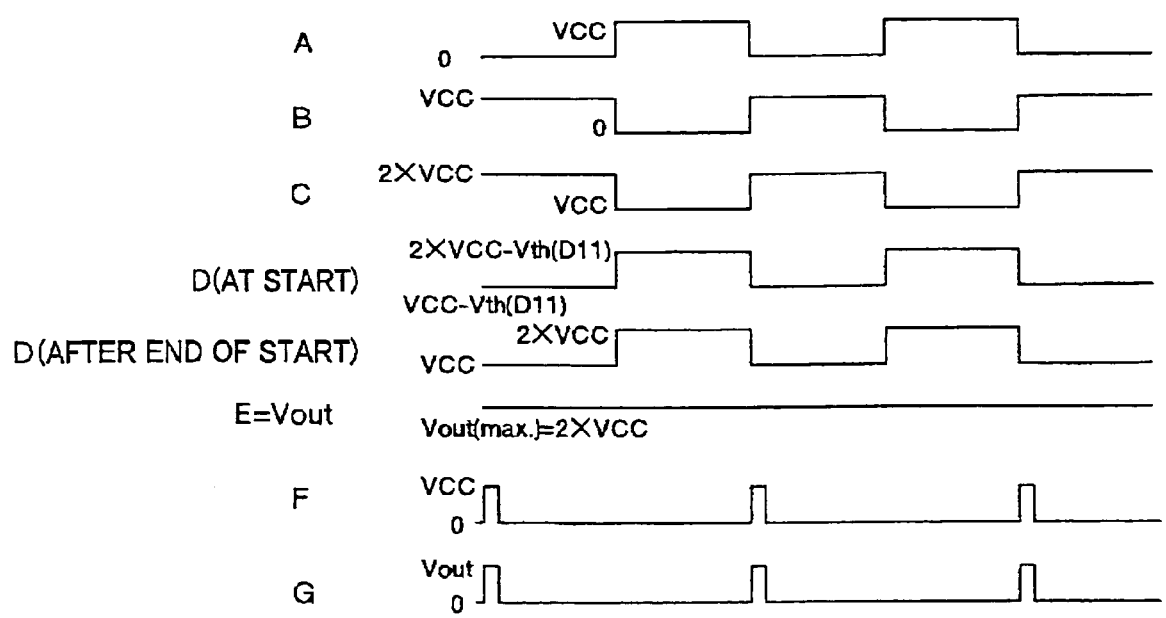
FIG. 12 is a timing chart of assistance in explaining circuit operation of the charge pump type DD converter of the voltage raising type according to the embodiment of the present invention.

The fundamental circuit operation of the charge pump type DD converter of the voltage raising type is also exactly the same as that of the DD converter of the negative voltage generating type shown in FIG. 9. The circuit operation of the charge pump type DD converter of the voltage raising type is different from that of the DD converter of the negative voltage generating type shown in FIG. 9 only in that a switching pulse voltage (control pulse voltage) is first diode-clamped at the time of a start and clamped at a VCC level (positive side circuit power supply potential) at the time of an end of the start process, and a voltage value 2×VCC twice the power supply voltage VCC is derived as the output voltage Vout. FIG. 12 is a timing chart showing signal waveforms A to G at nodes A to G, respectively, in the circuit of FIG. 11.

[First Application Example]

Figure 13:
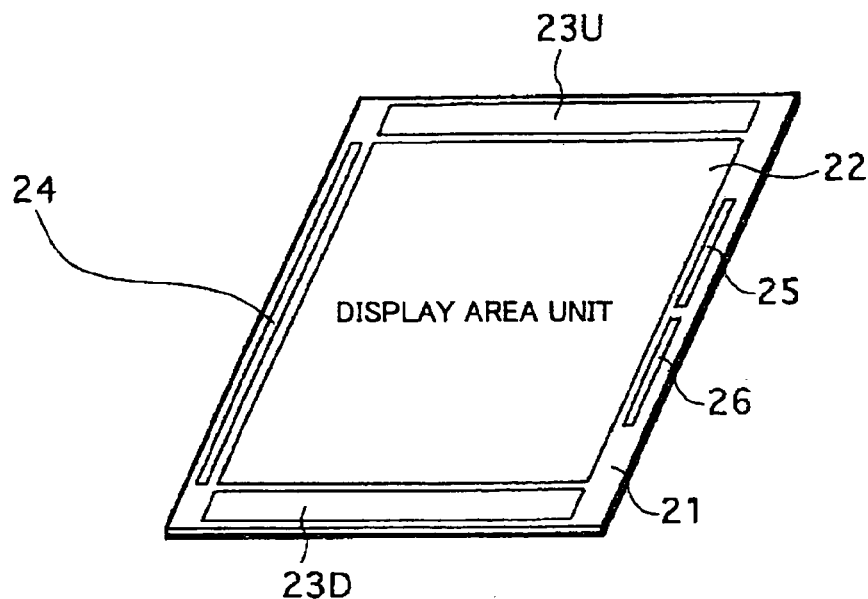
FIG. 13 is a schematic diagram showing an example of configuration of a display apparatus according to the present invention.

The charge pump type DD converters (power supply voltage converting circuits) according to the foregoing embodiments are used as a power supply circuit of a display apparatus such as an active matrix type liquid crystal display apparatus formed by arranging pixels in a matrix manner which pixels each use a liquid crystal cell as an electrooptic device, for example. An example of configuration of the display apparatus is shown in FIG. 13. Description in the following will be made by taking as an example an active matrix type liquid crystal display apparatus.

In FIG. 13, a display area unit 22 formed by arranging a large number of pixels each including a liquid crystal cell in a matrix manner, a pair of upper and lower H drivers (horizontal driving circuits) 23U and 23D, and a V driver (vertical driving circuit) 24 are mounted on a transparent insulating substrate, for example a glass substrate 21. Peripheral circuits such as a power supply circuit 25 and a power saving mode control circuit 26 are also integrated on the glass substrate 21.

The glass substrate 21 is formed by a first substrate formed by arranging a large number of pixel circuits each including an active device (for example a transistor) in a matrix manner and a second substrate disposed opposite at a predetermined distance from the first substrate. A liquid crystal display panel is formed by sealing a liquid crystal material between the first and second substrates.

Figure 14:
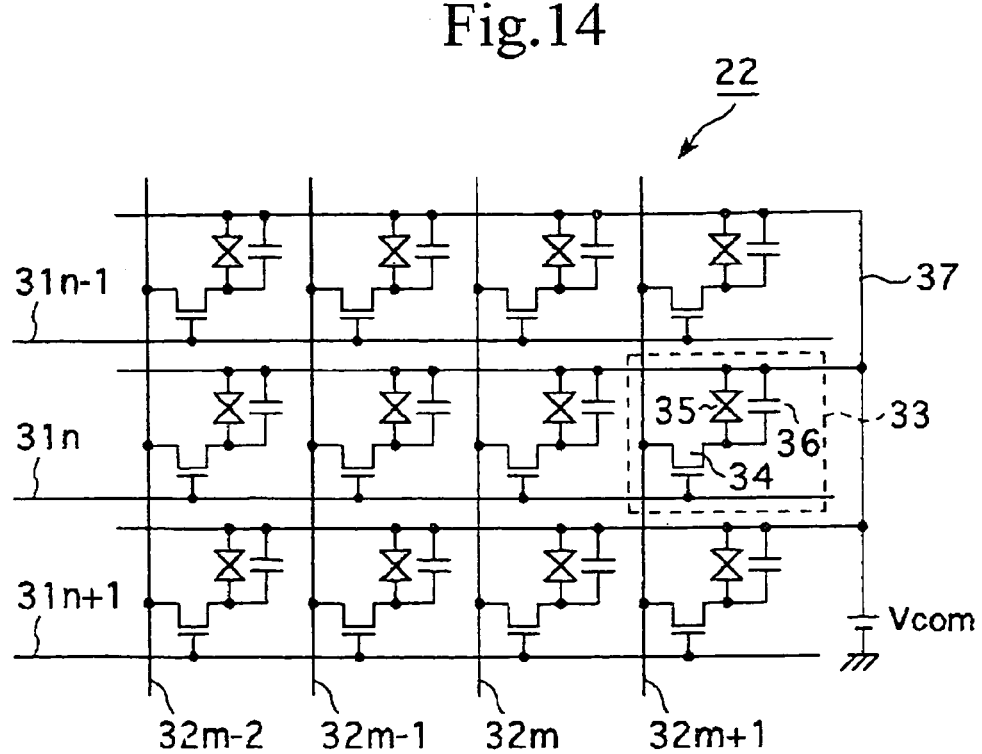
FIG. 14 is a circuit diagram showing an example of configuration of a display area unit of the liquid crystal display apparatus.

FIG. 14 shows an example of a concrete configuration of the display area unit 22. For simplicity of the figure, a pixel arrangement of three rows (an n−1 row to an n+1 row) and four columns (an m−2 column to an m+1 column) is taken as an example. The display area unit 22 in FIG. 14 has vertical scanning lines . . . , 31n−1, 31n, 31n+1, . . . and data lines (signal lines) . . . , 32m−2, 32m−1, 32m, 32m+1, . . . arranged in a matrix manner, and unit pixels 33 arranged at intersections of the vertical scanning lines and the data lines.

The unit pixels 33 each have a thin film transistor (hereinafter described as a TFT) 34, which is a pixel transistor, a liquid crystal cell 35, which is an electrooptic device, and a retaining capacitance 36. The liquid crystal cell 35 in this case represents a liquid crystal capacity occurring between a pixel electrode (one electrode) formed at the TFT 34 and an opposite electrode (the other electrode) formed opposite to the pixel electrode.

The TFTs 34 have gate electrodes connected to the vertical scanning lines . . . , 31n−1, 31n, 31n+1, . . . and source electrodes connected to the data lines . . . , 32m−2, 32m−1, 32m, 32m+1, . . . The pixel electrode of the liquid crystal cell 35 is connected to a drain electrode of the TFT 34, and the opposite electrode of the liquid crystal cell 35 is connected to a common line 37. The retaining capacitance 36 is connected between the drain electrode of the TFT 34 and the common line 37. The common line 37 is supplied with a predetermined direct-current voltage as a common voltage Vcom.

One end of each of the vertical scanning lines . . . , 31n−1, 31n, 31n+1, . . . is connected to an output terminal of a corresponding row of the V driver 24 shown in FIG. 13. The V driver 24 is formed by a shift register, for example. The V driver 24 sequentially generates a vertical selection pulse in synchronism with a vertical transfer clock VCK (not shown), and supplies the vertical selection pulse to the vertical scanning lines . . . , 31n−1, 31n, 31n+1, . . . to thereby perform vertical scanning.

One end of each of odd-numbered data lines . . . , 32m−1, 32m+1, . . . , for example, in the display area unit 22 is connected to an output terminal of a corresponding column of the H driver 23U shown in FIG. 13, while another end of each of even-numbered data lines . . . , 32m−2, 32m, . . . is connected to an output terminal of a corresponding column of the H driver 23D shown in FIG. 13. A concrete example of a configuration of the H drivers 23U and 23D is shown in FIG. 15.

Figure 15:
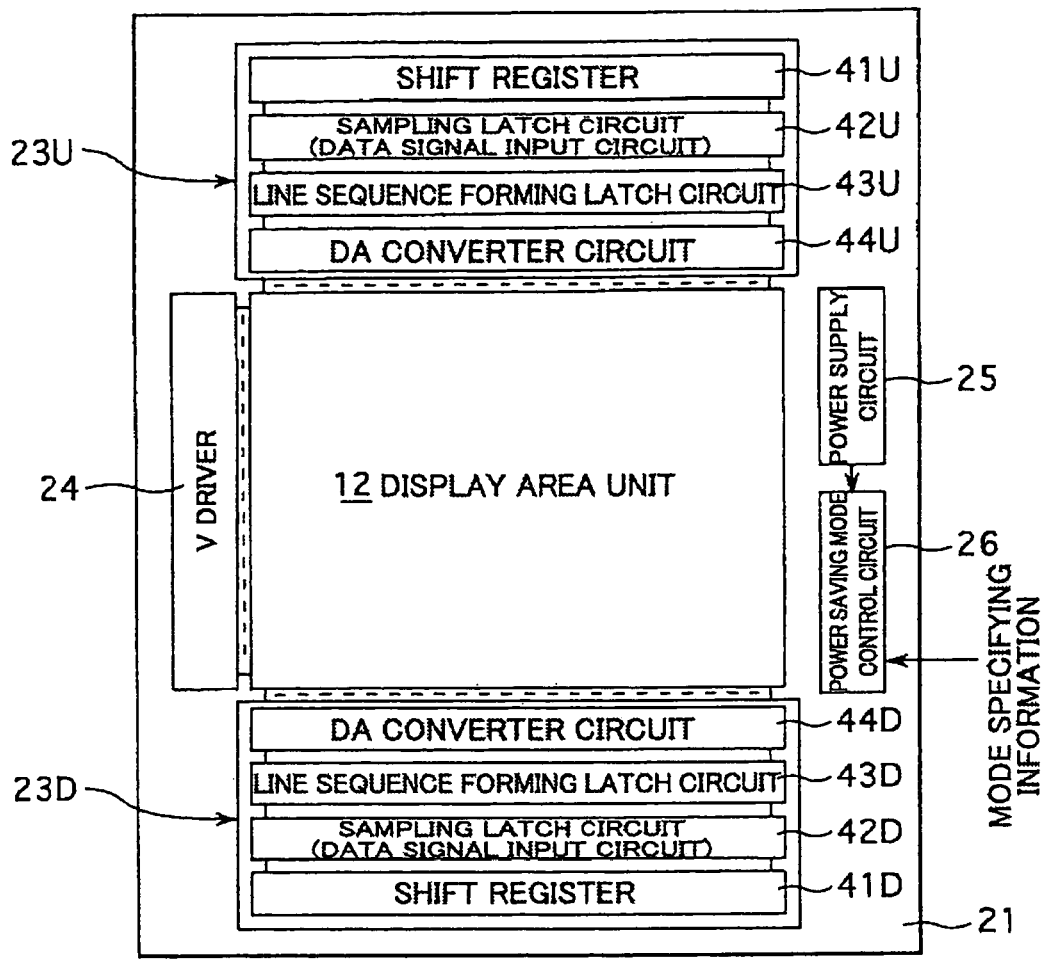
FIG. 15 is a block diagram showing an example of configuration of an active matrix type liquid crystal display apparatus according to a first application example.

As shown in FIG. 15, the H driver 23U has a shift register 41U, a sampling latch circuit (data signal input circuit) 42U, a line sequence forming latch circuit 43U, and a DA converter circuit 44U. The shift register 41U sequentially outputs a shift pulse from each transfer stage in synchronism with a horizontal transfer clock HCK (not shown), thereby performing horizontal scanning. In response to the shift pulse supplied from the shift register 41U, the sampling latch circuit 42U samples and latches input digital image data of predetermined bits in dot sequence.

The line sequence forming latch circuit 43U relatches, by a unit of a single line, the digital image data latched in dot sequence by the sampling latch circuit 42U, thereby forming the digital image data into line sequence, and then outputs the single line of digital image data simultaneously. The DA converter circuit 44U has a circuit configuration of a reference voltage selection type, for example. The DA converter circuit 44U converts the single line of digital image data outputted from the line sequence forming latch circuit 43U into an analog image signal, and then supplies the analog image signal to the data lines . . . , 32m−2, 32m−1, 32m, 32m+1, . . . in the pixel area unit 22 described above.

Exactly similar to the upper H driver 23U, the lower H driver 23D has a shift register 41D, a sampling latch circuit 42D, a line sequence forming latch circuit 43D, and a DA converter circuit 44D. It is to be noted that while the liquid crystal display apparatus according to the present example is configured such that the H drivers 23U and 23D are arranged at positions over and under the display area unit 22, the liquid crystal display apparatus according to the present example is not limited to this; the H drivers 23U and 23D may be arranged only at either of the positions over and under the display area unit 22.

As described above, peripheral circuits such as the power supply circuit 25 and the power saving mode control circuit 26 are also integrated on the same glass substrate 21 of the display area unit 22. In the case of a liquid crystal display apparatus configured such that the H drivers 23U and 23D are arranged at positions over and under the display area unit 22, for example, it is desirable to dispose the peripheral circuits such as the power supply circuit 25 and the power saving mode control circuit 26 in a frame area (a peripheral area of the display area unit 22) on sides where the H drivers 23U and 23D are not mounted.

The reason is that since as described above, the H drivers 23U and 23D have a large number of components as compared with the V driver 24 and thus often have a very large circuit area, by mounting the peripheral circuits such as the power supply circuit 25 and the power saving mode control circuit 26 in a frame area on sides where the H drivers 23U and 23D are not mounted, the peripheral circuits such as the power supply circuit 25 and the power saving mode control circuit 26 can be integrated on the same glass substrate 21 of the display area unit 22 without decreasing an effective screen ratio (an area ratio of the effective area unit 22 to the glass substrate 21).

Incidentally, since the active matrix type liquid crystal display apparatus according to the first application example has the V driver 24 integrated on one side of a frame area on sides where the H drivers 23U and 23D are not mounted, the peripheral circuits such as the power supply circuit 25 and the power saving mode control circuit 26 are integrated on the other side of the frame area on the sides.

In this case, the charge pump type DD converters (power supply voltage converting circuits) according to the foregoing embodiments are used as the power supply circuit 25. In integrating the power supply circuit 25, since the TFT 34 is used as each of the pixel transistors of the display area unit 22, TFTs are also used as transistors forming the power supply circuit 25, that is, the MOS transistors Qp11 to Qp13 and Qn11 to Qn13, as well as transistors forming the level shift circuit 15 and the like in the charge pump type DD converter shown in FIG. 9. By producing at least the transistor circuits using the same process as that of the display area unit 22, the circuits are manufactured more easily and realized at lower cost.

In particular, when of the transistor circuits, the diode D11, the MOS transistors Qp12, Qp13, Qn12, and Qn13, and the transistors forming the level shift circuit 15 required to withstand high voltage, except the CMOS transistor 11 which operates at 0 V−VCC, are formed by TFTs, device separation is not required. Therefore, the diode D11, the MOS transistors Qp12, Qp13, Qn12, and Qn13, and the transistors forming the level shift circuit 15 are produced more easily by using the same process as that of the display area unit 22. In this case, other transistor circuits and the like may be produced on a silicon chip on a substrate separate from the glass substrate 21.

Integration of TFTs has become easier with a recent improvement in performance of TFTs and a decrease in power consumption of TFTs. Thus, by integrally forming the power supply circuit 25, or at least the transistor circuits, in particular, on the same glass substrate 21 of the pixel transistors of the display area unit 22 by the same process using TFTs, it is possible to reduce cost as a result of the simplification of the manufacturing process and also make the display apparatus thinner and more compact as a result of the integration.

It is to be noted that while in the above application example, the charge pump type DD converters according to the foregoing embodiments are used as the power supply circuit 25 and the power supply circuit 25 is formed integrally with the display area unit 22 on the glass substrate 21, the power supply circuit 25 does not necessarily need to be formed integrally with the display area unit 22. Specifically, the power supply circuit 25 may be used as a circuit external to the liquid crystal display apparatus, and also the power supply circuit 25 may be formed on a substrate separate from the glass substrate 21.

However, it is clear from the above description that the power supply circuit 25 is more advantageously formed integrally with the display area unit 22 on the same substrate. In addition, since the charge pump type DD converters according to the foregoing embodiments provide a high current capacity on a small-area circuit scale and produce very great effect especially when a transistor with a high threshold value Vth such as a TFT is used, forming the power supply circuit 25 integrally with the display area unit 22 on the same substrate greatly contributes to reducing the cost of a set including the liquid crystal display apparatus and making the set thinner and more compact.

Figure 16:
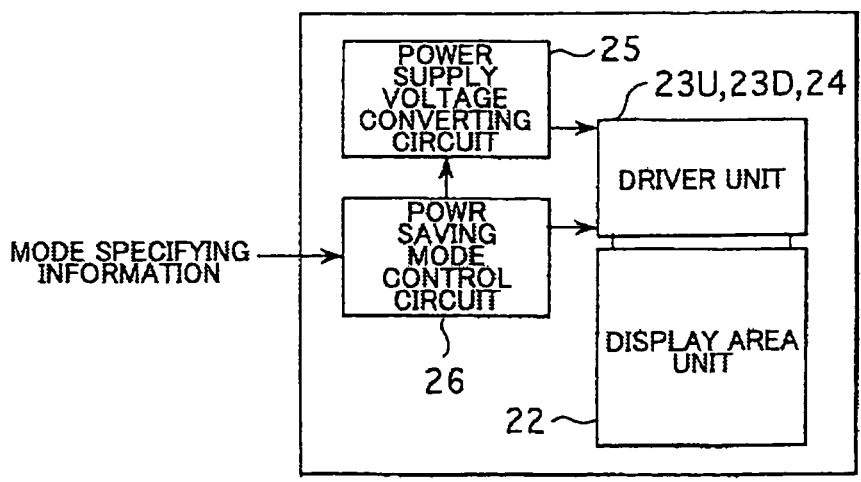
FIG. 16 is a schematic block diagram showing a display apparatus that selectively uses a power saving mode.

The power saving mode control circuit 26 in FIG. 13 and FIG. 15 is provided to selectively set a power saving mode to reduce power consumption of the apparatus as a whole. As shown in FIG. 16, the power saving mode control circuit 26 effects power saving mode control on the power supply circuit 25 on the basis of external information specifying the mode. In FIG. 16, for simplicity of the figure, the H drivers 23U and 23D and the V driver 24 are shown collectively in a single block (driver unit).

(First Practical Application Example of DD Converter)

Figure 17:
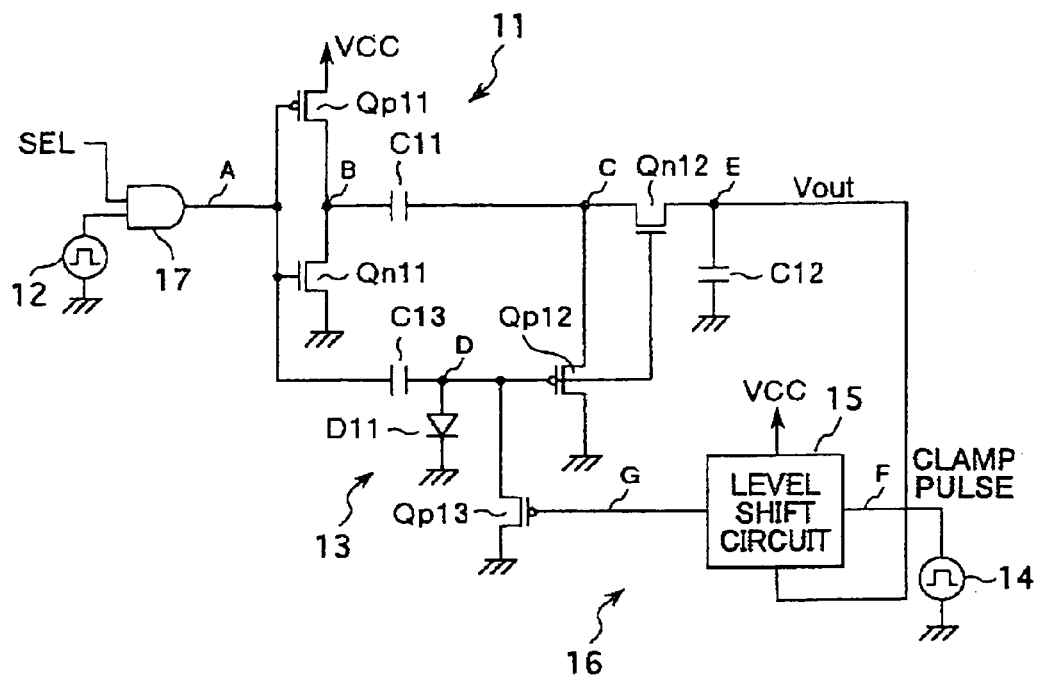
FIG. 17 is a circuit diagram showing a configuration of a charge pump type DD converter of the negative voltage generating type according to a first practical application example.

FIG. 17 is a circuit diagram showing a first practical application example of the charge pump type DD converter of the negative voltage generating type according to the foregoing embodiment (see FIG. 9). In the figure, the same parts as in FIG. 9 are identified by the same reference numerals.

A circuit configuration of FIG. 17 is exactly the same as that of FIG. 9 except that a two-input AND circuit 17 is newly added in a stage preceding a CMOS inverter 11 in FIG. 17. The two-input AND circuit 17 receives a switching pulse generated by a pulse generating source 12 as one input, and receives, as the other input, a mode selection signal SEL at an "L" level supplied from the power saving mode control circuit 26 shown in FIG. 16 at the time of the power saving mode.

When the thus formed DD converter of the negative voltage generating type according to the first practical application example is supplied with the mode selection signal SEL at the "L" level at the time of the power saving mode, the AND circuit 17 stops supplying the switching pulse generated by the pulse generating source 12 to circuits within the DD converter. This temporarily stops pumping operation of the charge pump circuit. Therefore, current consumed by the circuits within the DD converter is reduced, thus saving power.

Even when clock supply to the charge pump circuit is temporarily stopped by setting the power saving mode, a control pulse (switching pulse) voltage for the switch device (Nch MOS transistor Qn12 and Pch MOS transistor Qp12) provided in the output unit is clamped in two separate stages at the time of a start and after an end of the start process, as described above. The clamped level at a node D is thereby stabilized. Therefore, it is possible to secure a sufficient current capacity even in a period of transition to a clock supply/stop, and thus it is possible to perform stable DC-to-DC conversion operation.

Figure 18:
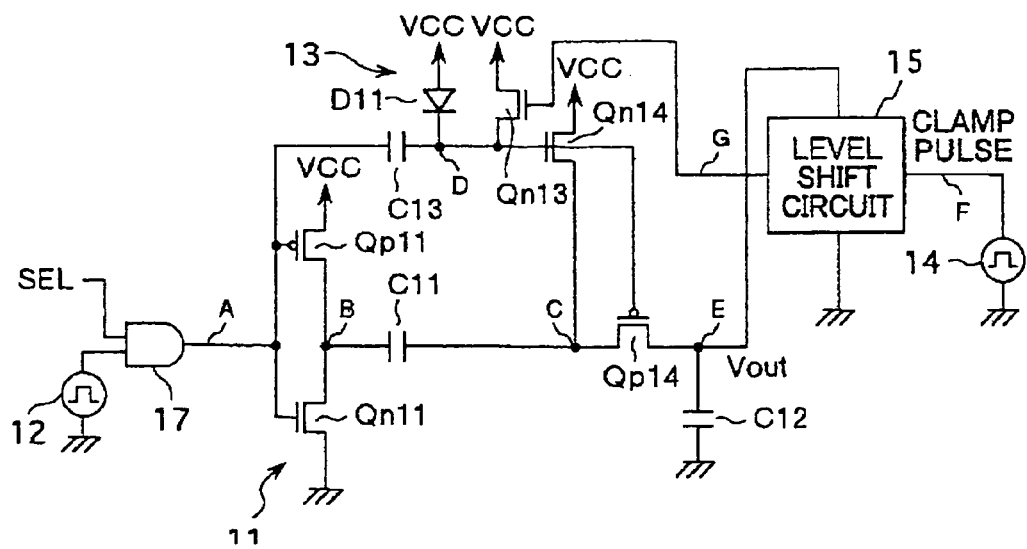
FIG. 18 is a circuit diagram showing a configuration of a charge pump type DD converter of the voltage raising type according to the first practical application example.

FIG. 18 shows a configuration of a charge pump type DD converter of a voltage raising type according to the first practical application example. Fundamental circuit configuration and circuit operation of the charge pump type DD converter of the voltage raising type are the same as those of the charge pump type DD converter of the negative voltage generating type, and therefore description of the circuit configuration and circuit operation of the charge pump type DD converter of the voltage raising type will be omitted.

(Second Practical Application Example of DD Converter)

Figure 19:
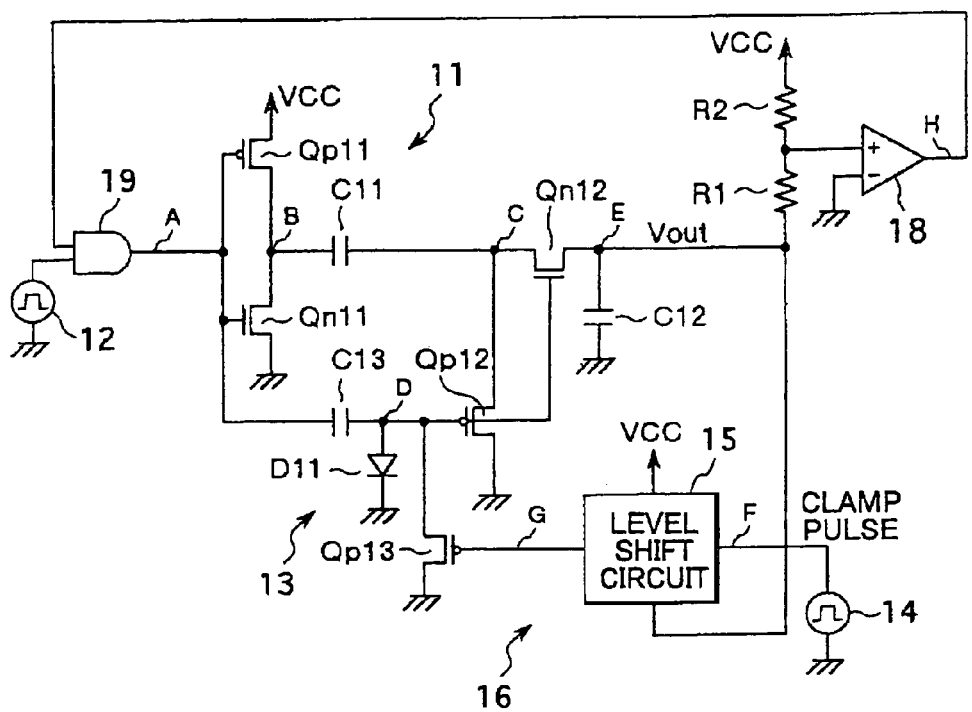
FIG. 19 is a circuit diagram showing a configuration of a charge pump type DD converter of the negative voltage generating type according to a second practical application example.

FIG. 19 is a circuit diagram showing a second practical application example of the charge pump type DD converter of the negative voltage generating type according to the foregoing embodiment (see FIG. 9). In the figure, the same parts as in FIG. 9 are identified by the same reference numerals. The charge pump type DD converter according to the second practical application example has a function of regulating an output potential.

The regulation circuit according to the second practical application example in FIG. 19 includes resistances R1 and R2 connected in series with each other between a circuit output terminal (node E) and a power supply (VCC) or a ground; a comparator 18 having a noninverting (+) input terminal connected to a voltage dividing point of the resistances R1 and R2, and an inverting (−) input terminal supplied with a reference voltage (ground level in this example); and an AND circuit 19 disposed in a stage preceding a CMOS inverter 11 and receiving a switching pulse generated by a pulse generating source 12 as one input and a comparison output of the comparator 18 as another input.

Figure 20:
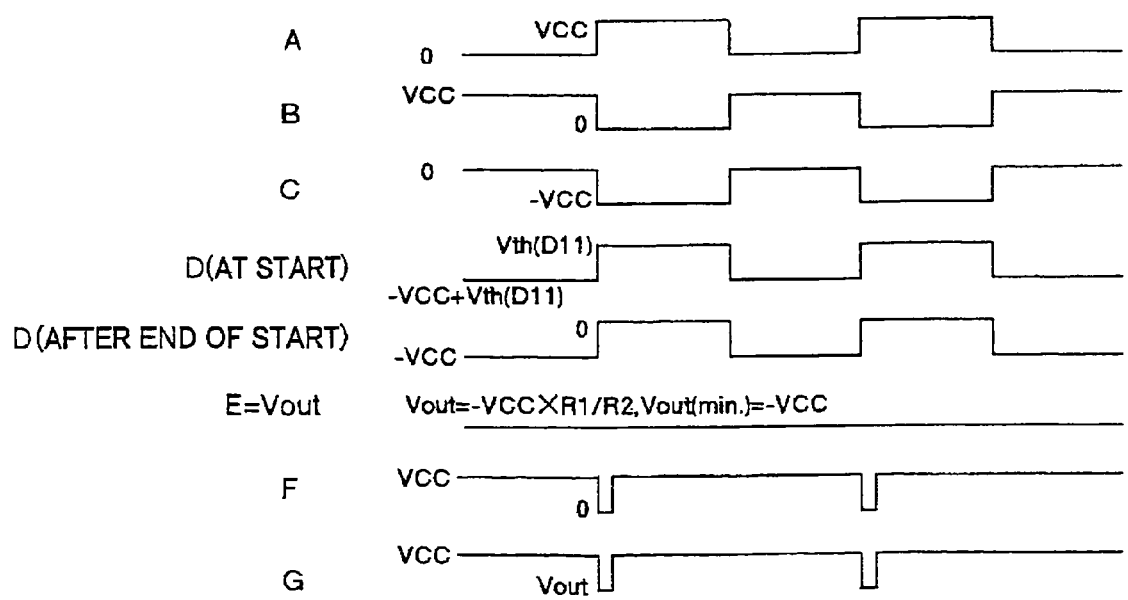
FIG. 20 is a timing chart of assistance in explaining circuit operation of the charge pump type DD converter of the negative voltage generating type according to the second practical application example.

The configuration of FIG. 19 is exactly the same as the configuration of FIG. 9 except that the regulation circuit is newly added. Also, charge pump operation of the circuit of FIG. 19 is basically the same as that of the circuit of FIG. 9. FIG. 20 is a timing chart of assistance in explaining operation of the circuit of FIG. 19. Waveforms A to H in the timing chart represent signal waveforms at nodes A to H, respectively, in the circuit of FIG. 19.

The comparator 18 in the thus formed DD converter of the negative voltage generating type according to the second practical application example compares an output voltage Vout with the reference voltage (for example ground level). The AND circuit 18 controls the supplying/stopping of a switching pulse on the basis of a result of the comparison, whereby circuit operation for regulation of the output voltage Vout to the ground level (0 V), for example, is performed. When the output voltage Vout becomes lower than a target voltage, feedback is effected so as to stop the supply of the switching pulse. As a result, a target voltage value determined by a voltage dividing ratio of the resistances R1 and R2 is obtained as the output voltage Vout.

Even when clock supply to the charge pump is temporarily stopped by the regulation operation, a control pulse (switching pulse) voltage for the switch device (Nch MOS transistor Qn12 and Pch MOS transistor Qp12) is clamped in two separate stages at the time of a start and after an end of the start process, as described above. The clamped level at a node D is thereby stabilized. Therefore, it is possible to perform stable regulation operation.

Figure 21:
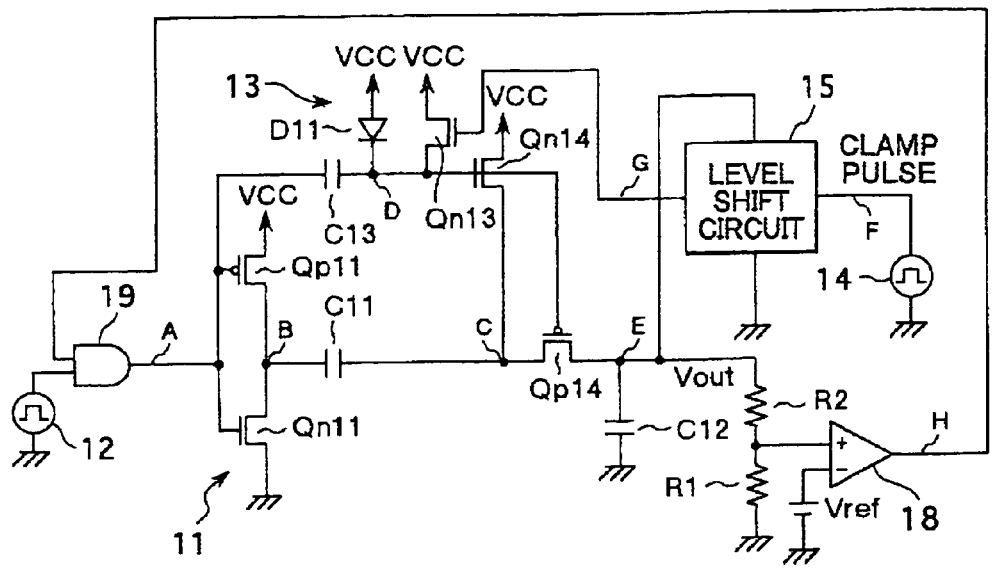
FIG. 21 is a circuit diagram showing a configuration of a charge pump type DD converter of the voltage raising type according to the second practical application example.
Figure 22:
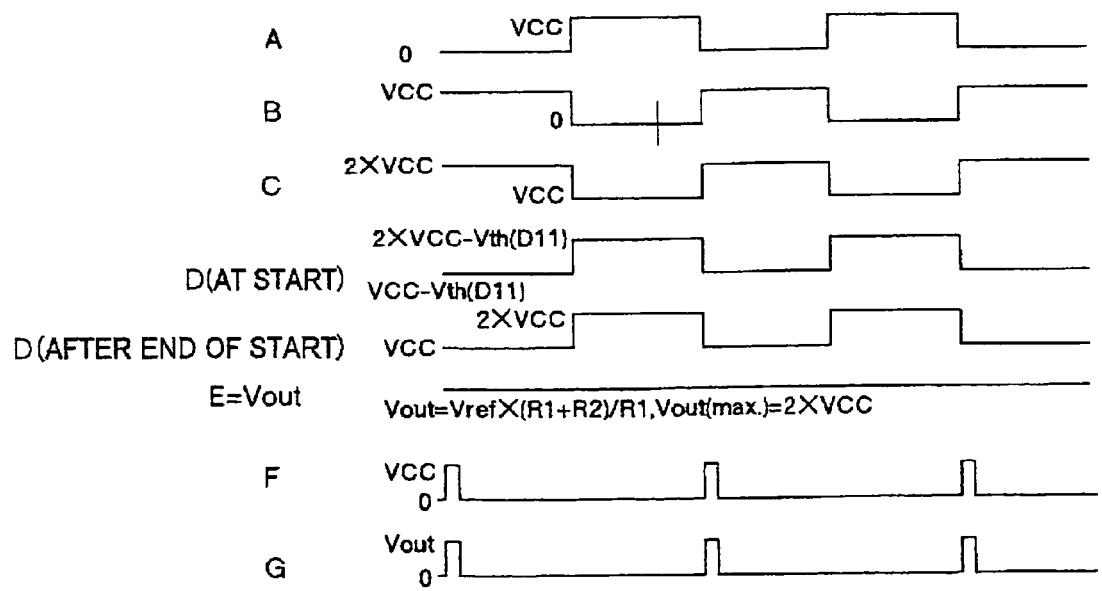
FIG. 22 is a timing chart of assistance in explaining circuit operation of the charge pump type DD converter of the voltage raising type according to the second practical application example.

FIG. 21 shows a configuration of a charge pump type DD converter of a voltage raising type according to the second practical application example. FIG. 22 is a timing chart of assistance in explaining operation of the circuit of FIG. 21. Waveforms A to H in the timing chart represent signal waveforms at nodes A to H, respectively, in the circuit of FIG. 21.

A comparator 18 in the DD converter of the voltage raising type compares an output voltage Vout with a reference voltage (for example a reference voltage Vref). An AND circuit 19 controls the supplying/stopping of a switching pulse on the basis of a result of the comparison, whereby circuit operation for regulation of the output voltage Vout to a ground level (0 V), for example, is performed.

When the output voltage Vout becomes higher than a target voltage, the DD converter of the voltage raising type effects feedback so as to stop the supply of the switching pulse. As a result, a target voltage value determined by a voltage dividing ratio of resistances R1 and R2 is obtained as the output voltage Vout. The other circuit operation is basically the same as that of the charge pump type DD converter of the negative voltage generating type.

As with the DD converter according to the foregoing embodiment (see FIG. 9), the DD converters (power supply voltage converting circuits) according to the first and second practical application examples as described above can be used as the power supply circuit 25 of the active matrix type liquid crystal display apparatus according to the first application example.

The foregoing power saving mode control circuit 26, when the power saving mode is externally specified, effects control to lower power supply current in the H drivers 23U and 23D and the V driver 24 and reduce a current supply capacity of the power supply circuit 25, as well as effecting power saving mode control on the power supply circuit 25.

The power saving mode of the active matrix type liquid crystal display apparatus includes a partial screen display mode (partial mode) in which information is displayed only in a partial area of the display area unit 22, a two-level gradation display mode in which eight-color display is made with 1 bit for each of R (red), G (green), and B (blue), as opposed to a normal mode in which 260,000-color display is made with 6 bits for each of R, G, and B, for example, and the like.

In the partial screen display mode, for example, of the power saving modes, specific information is displayed only in a part, for example an upper part of the display area unit 22, while a specific color, for example white or black is displayed in a non-display area. In the non-display area, it suffices to display information of white or black at all times, thus eliminating the need for the H drivers 23U and 23D to rewrite information. Accordingly, by stopping the H drivers 23U and 23D, power consumption can be reduced by an amount of power that would normally be consumed by the H drivers 23U and 23D.

Thus, the active matrix type liquid crystal display apparatus in the power saving mode can reduce power consumption by stopping operation of the H drivers 23U and 23D for the non-display area, and also reduce power consumption in the power supply circuit 25 by reducing the current supply capacity of the power supply circuit 25. Therefore, power consumption of the display apparatus as a whole can be further reduced. Furthermore, since DC-to-DC conversion efficiency is defined as power consumption of load/total power consumption and thus total power consumption=power consumption of load+power consumption of the present circuit, it is possible to improve conversion efficiency by reducing the power consumption of the present circuit.

Figure 1:
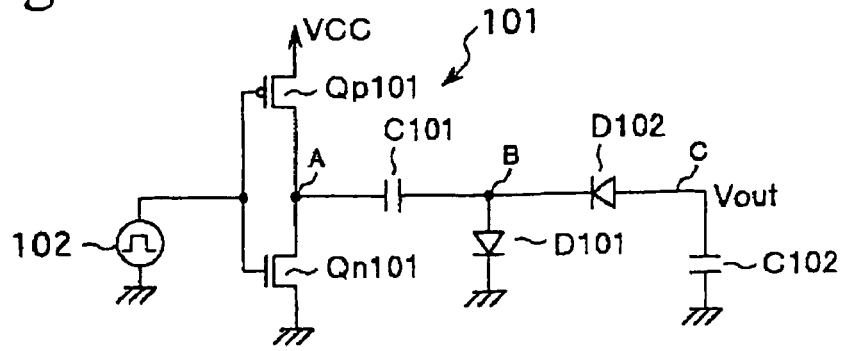
FIG. 1 is a circuit diagram showing a configuration of a charge pump type DD converter of a negative voltage generating type according to a first conventional example.
Figure 2:
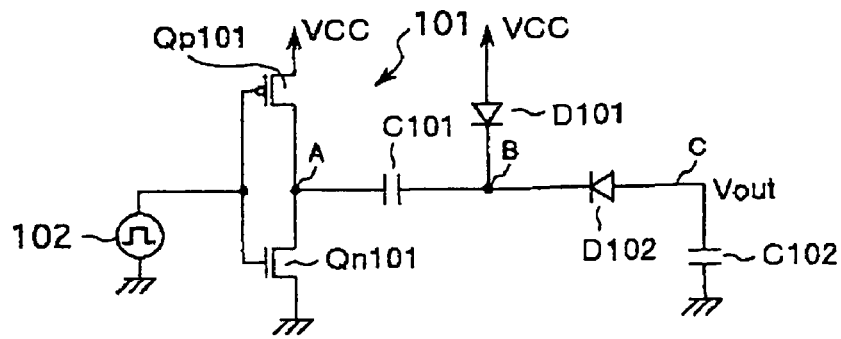
FIG. 2 is a circuit diagram showing a configuration of a charge pump type DD converter of a voltage raising type according to the first conventional example.
Figure 3:
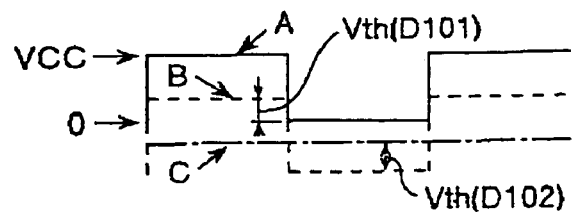
FIG. 3 is a timing chart of assistance in explaining circuit operation of the charge pump type DD converter of the negative voltage generating type according to the first conventional example.
Figure 4:
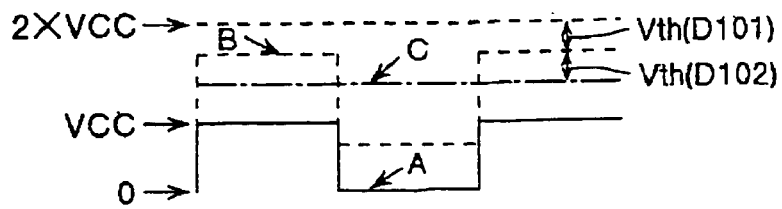
FIG. 4 is a timing chart of assistance in explaining circuit operation of the charge pump type DD converter of the voltage raising type according to the first conventional example.
Figure 5:
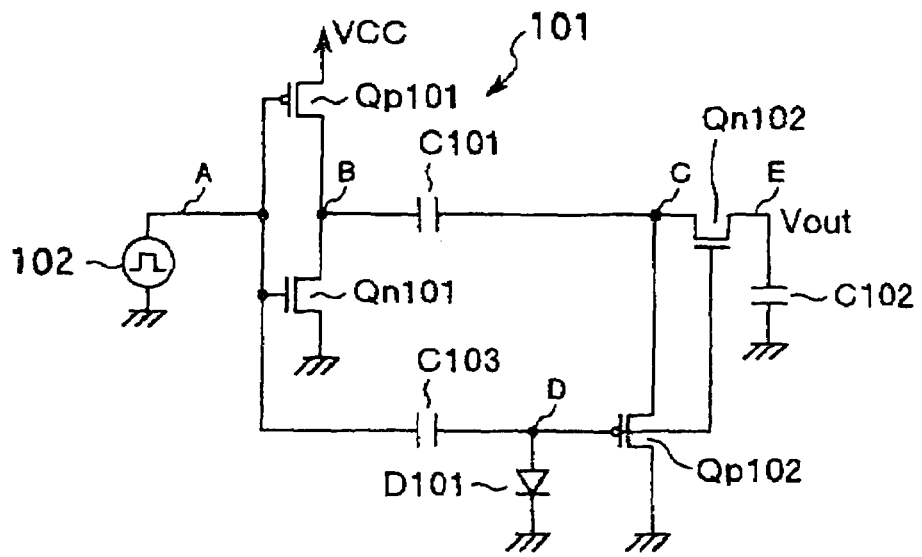
FIG. 5 is a circuit diagram showing a configuration of a charge pump type DD converter of the negative voltage generating type according to a second conventional example.
Figure 6:
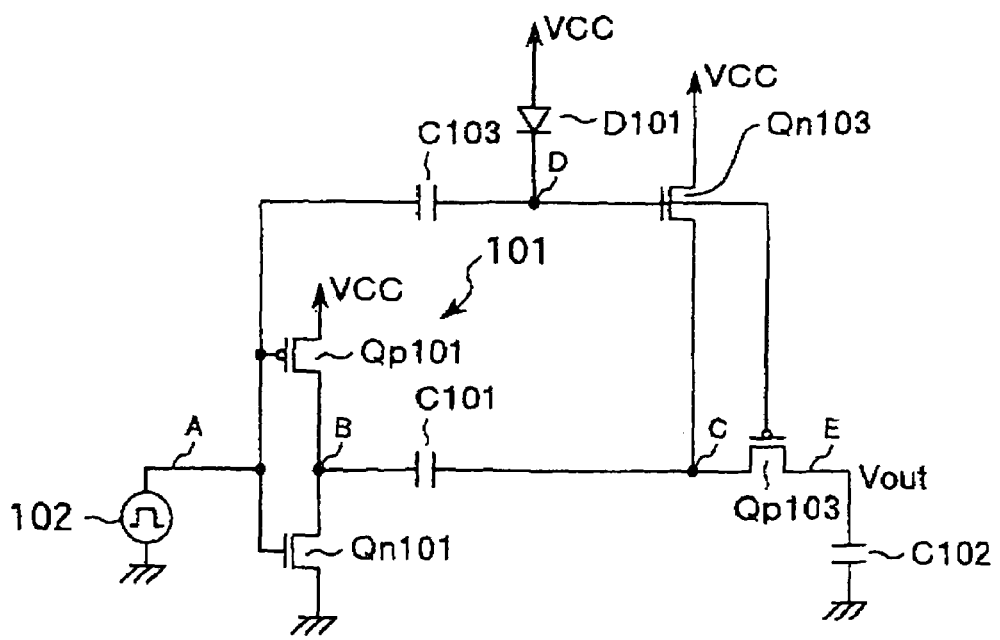
FIG. 6 is a circuit diagram showing a configuration of a charge pump type DD converter of the voltage raising type according to the second conventional example.
Figure 7:
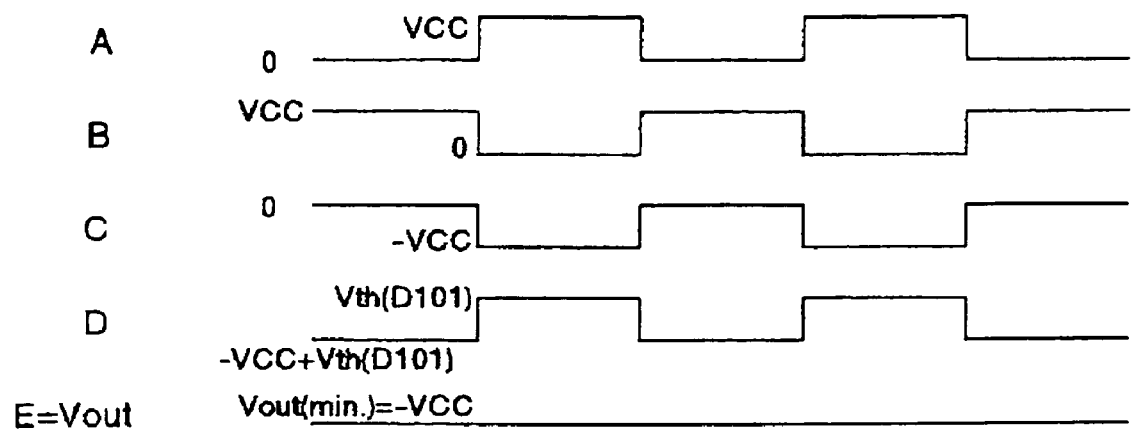
FIG. 7 is a timing chart of assistance in explaining circuit operation of the charge pump type DD converter of the negative voltage generating type according to the second conventional example.
Figure 8:
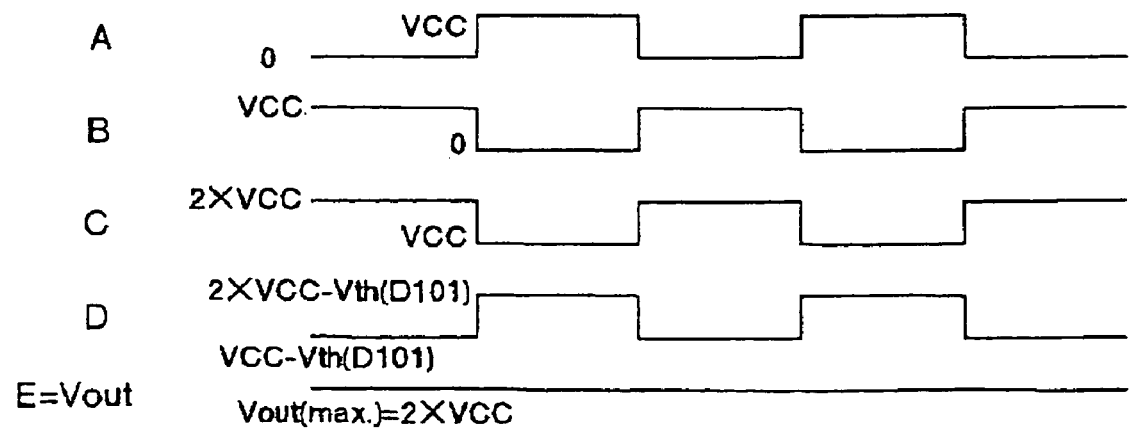
FIG. 8 is a timing chart of assistance in explaining circuit operation of the charge pump type DD converter of the voltage raising type according to the second conventional example.

A specific configuration of a power saving mode-capable power supply circuit 25 will be described in the following. The charge pump type DD converters according to the foregoing embodiments or the practical application examples thereof may be used as the power supply circuit 25. However, since the power supply circuit 25 is not characterized by its specific circuit configuration, the charge pump type DD converters corresponding to the second conventional examples shown in FIG. 5 and FIG. 6 are chosen to be used as a fundamental circuit in this case. Also, setting of the partial screen display mode (partial mode) as the power saving mode will be taken as an example.

(Third Practical Application Example of DD Converter)

Figure 23:
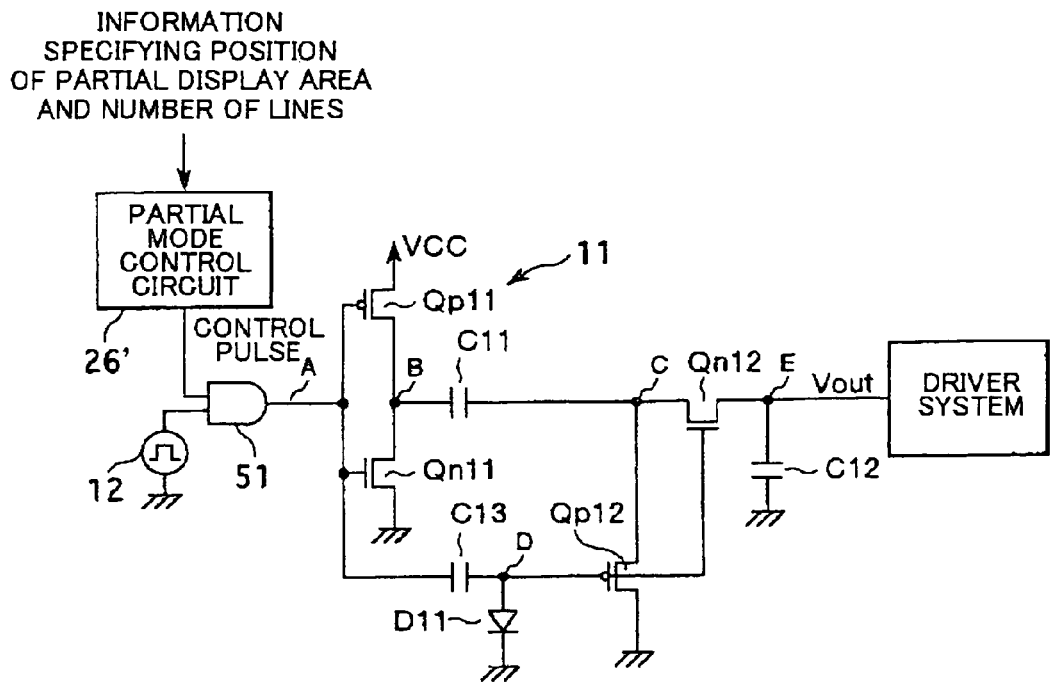
FIG. 23 is a circuit diagram showing a configuration of a charge pump type DD converter of the negative voltage generating type according to a third practical application example.

FIG. 23 is a circuit diagram showing a third practical application example of the charge pump type DD converter of the negative voltage generating type. In the figure, the same parts as in FIG. 9 are identified by the same reference numerals. The charge pump type DD converter according to the third practical application example is different in circuit configuration from the charge pump type DD converter according to the foregoing embodiment only in that the charge pump type DD converter according to the third practical application example does not have the second clamp circuit 16 (see FIG. 9 and FIG. 11).

A partial mode control circuit 26' in FIG. 23 corresponds to the power saving mode control circuit 26 in FIG. 13 and FIG. 15. The partial mode control circuit 26' outputs a control pulse at an "H" level (high level) in the normal mode. When the power saving mode, that is, the partial screen display mode is set, the partial mode control circuit 26' outputs a control pulse at an "L" level (low level) during a period of a non-display area of the screen on the basis of externally supplied information specifying a position of a partial display area and the number of lines.

The control pulse is one input to an AND circuit 51. The AND circuit 51 receives a clock pulse generated by a pulse generating source 12 as another input. The AND circuit 51 passes the clock pulse only during a period when the control pulse is supplied. The clock pulse passed through the AND circuit 51 is applied as a switching pulse to a gate common connection point of a CMOS inverter 11.

Figure 24:
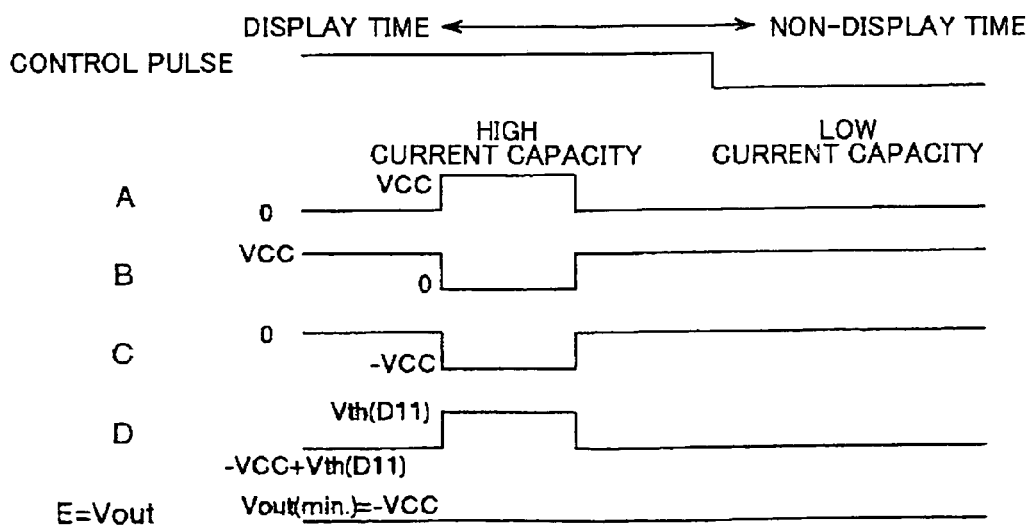
FIG. 24 is a timing chart of assistance in explaining circuit operation of the charge pump type DD converter of the negative voltage generating type according to the third practical application example.

Circuit operation of the thus formed charge pump type power supply voltage converting circuit of the negative voltage generating type according to the third practical application example will next be described with reference to a timing chart of FIG. 24. Waveforms A to E in the timing chart represent signal waveforms at nodes A to E, respectively, in the circuit of FIG. 23.

First, in the normal mode, the partial mode control circuit 26' outputs the control pulse at the "H" level. Hence, the clock pulse generated by the pulse generating source 12 is passed through the AND circuit 51 and then supplied as a switching pulse to the gate common connection point of the CMOS inverter 11. In this case, an output potential of a capacitor C13, that is, a potential of the node D based on the switching pulse is clamped by a diode D11.

When the switching pulse is at an "L" level (0 V), Pch MOS transistors Qp11 and Qp12 are in an on state, and therefore a capacitor C11 is charged. In this case, an Nch MOS transistor Qn11 is in an off state, and therefore a potential of the node B is at a VCC level. Then, when the switching pulse is at an "H" level (VCC), the Nch MOS transistor Qn11 and an Nch MOS transistor Qn12 are in an on state, and the potential of the node B is at a ground level (0 V), so that a potential of the node C is at a −VCC level. The potential of the node C is passed through the Nch MOS transistor Qn12 as it is, and then becomes an output voltage Vout (=−VCC).

Next, when the partial mode (partial screen display mode) is set, the partial mode control circuit 26' outputs the control pulse at the "L" level during a period of a non-display area of the screen on the basis of externally supplied information specifying a position of a partial display area and the number of lines. Then, according to the control pulse at the "L" level, the AND circuit 51 prohibits passage of the clock pulse generated by the pulse generating source 12. Thus, supply of the switching pulse to the charge pump circuit is stopped.

Since the switching pulse is not supplied, pumping operation of the charge pump circuit is stopped. In this case, the current supply capacity (current capacity) of the charge pump circuit, that is, the present DD converter is reduced to substantially zero. Specifically, the current supply capacity of the charge pump circuit is in inverse proportion to frequency of the switching pulse and capacitance of the capacitor C11. Thus, stopping the supply of the switching pulse reduces the frequency of the switching pulse to zero and hence reduces the current supply capacity to substantially zero.

It is preferable to set the period for reducing the current supply capacity (current capacity) of the present DD converter as long as possible from a viewpoint of reducing power consumption. It is therefore desirable to set the period to most, for example ½ or more, of the period of a non-display area.

As described above, the power supply circuit 25 formed by the charge pump type DD converter stops the pumping operation of the charge pump circuit and thereby reduces the current supply capacity of the power supply circuit 25 during most of the period of a non-display area. Thus, an unnecessary through current can be prevented from flowing through the charge pump circuit during the non-display period when the driver system consumes less current, whereby power consumption of the power supply circuit 25 can be reduced. In addition, the reduction of the power consumption of the power supply circuit 25 improves DC-to-DC conversion efficiency.

Figure 25:
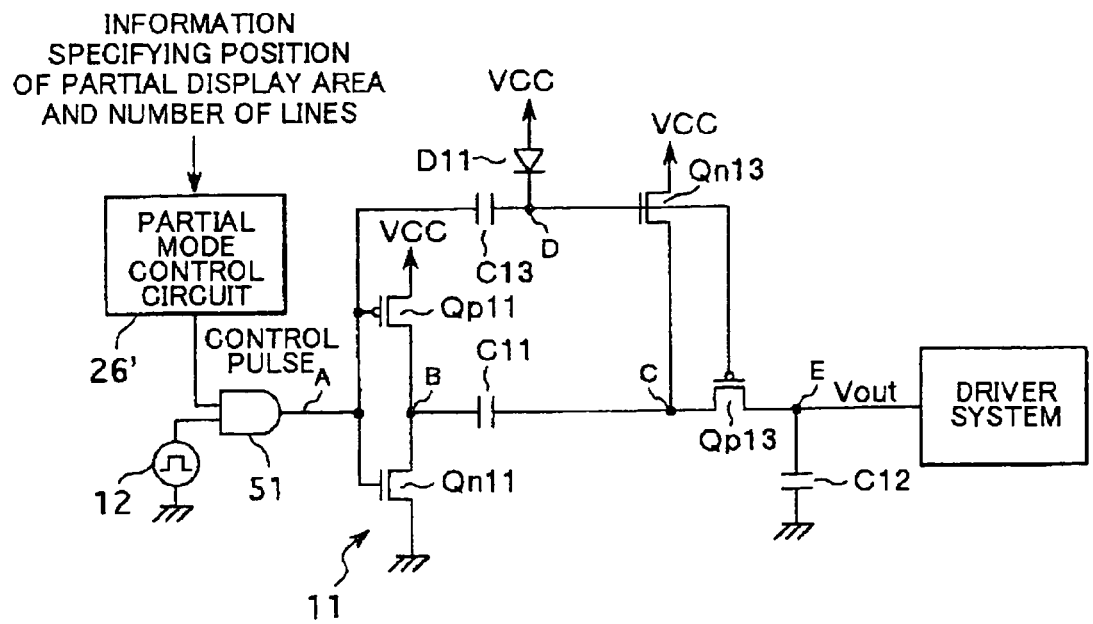
FIG. 25 is a circuit diagram showing a configuration of a charge pump type DD converter of the voltage raising type according to the third practical application example.

FIG. 25 shows a configuration of a charge pump type DD converter of a voltage raising type according to the third practical application example. Fundamental circuit configuration and circuit operation of the DD converter of the voltage raising type are the same as those of the DD converter of the negative voltage generating type.

Specifically, in FIG. 25, switching transistors (MOS transistors Qp13 and Qn13) are of an opposite conduction type from the MOS transistors Qn12 and Qp12 in the circuit of FIG. 23; and a diode D11 is connected between another end of a capacitor C11 and a power supply (VCC). The circuit of FIG. 25 is different in configuration from the circuit of FIG. 23 only in that respect.

Figure 26:
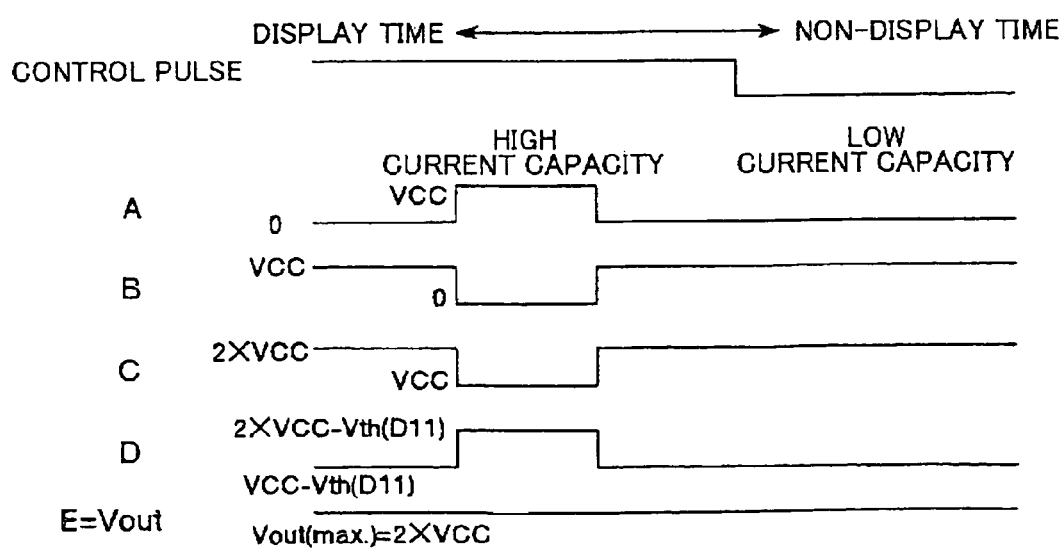
FIG. 26 is a timing chart of assistance in explaining circuit operation of the charge pump type DD converter of the voltage raising type according to the third practical application example.

The fundamental circuit operation of the circuit of FIG. 25 is also exactly the same as that of the circuit of FIG. 23. The circuit operation of the circuit of FIG. 25 is different from that of the circuit of FIG. 23 only in that a voltage value 2×VCC, twice the power supply voltage VCC, is derived as an output voltage Vout. FIG. 26 is a timing chart of signal waveforms A to E at nodes A to E, respectively, in the circuit of FIG. 25.

(Fourth Practical Application Example of DD Converter)

Figure 27:
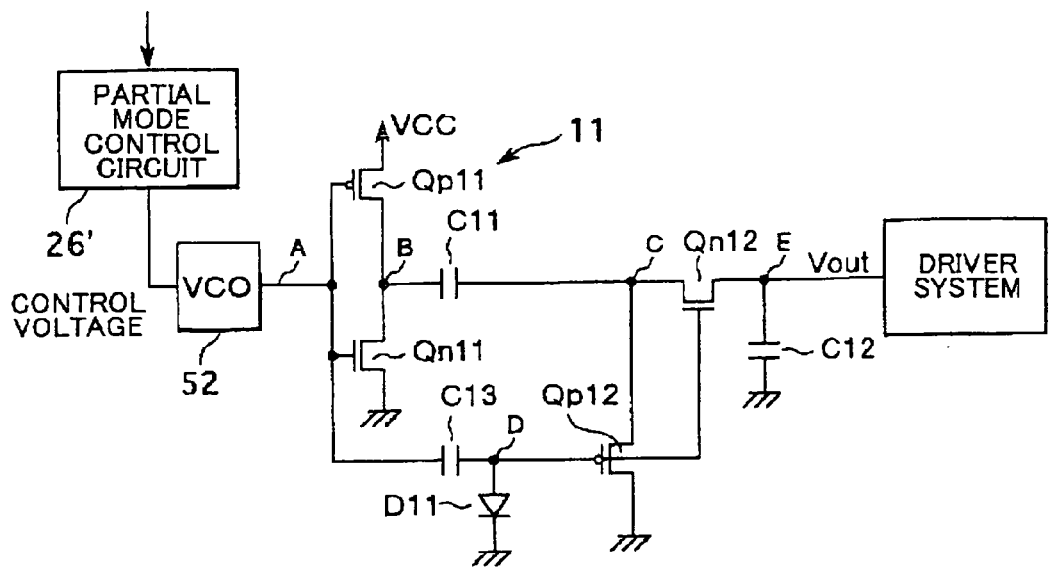
FIG. 27 is a circuit diagram showing a configuration of a charge pump type DD converter of the negative voltage generating type according to a fourth practical application example.

FIG. 27 is a circuit diagram showing a fourth practical application example of the charge pump type DD converter of the negative voltage generating type. In the figure, the same parts as in FIG. 23 are identified by the same reference numerals. The DD converter according to the fourth practical application example is provided with a VCO (voltage-controlled oscillator) 52 in place of the pulse generating source 12 and the AND circuit 51 in FIG. 23. Otherwise, the configuration of FIG. 27 is exactly the same as the configuration of FIG. 23.

In the normal mode, the VCO 52 is supplied with a control voltage at an "H" level, for example, from a partial mode control circuit 26', and thereby generates a first clock pulse of a predetermined frequency on the basis of the control voltage. In the partial mode, the VCO 52 is supplied with a control voltage at an "L" level, for example, from the partial mode control circuit 26', and thereby generates a second clock pulse of a frequency lower than that of the first clock pulse on the basis of the control voltage. The first and second clock pulses are applied as a switching pulse to a gate common connection point of a CMOS inverter 11.

Figure 28:
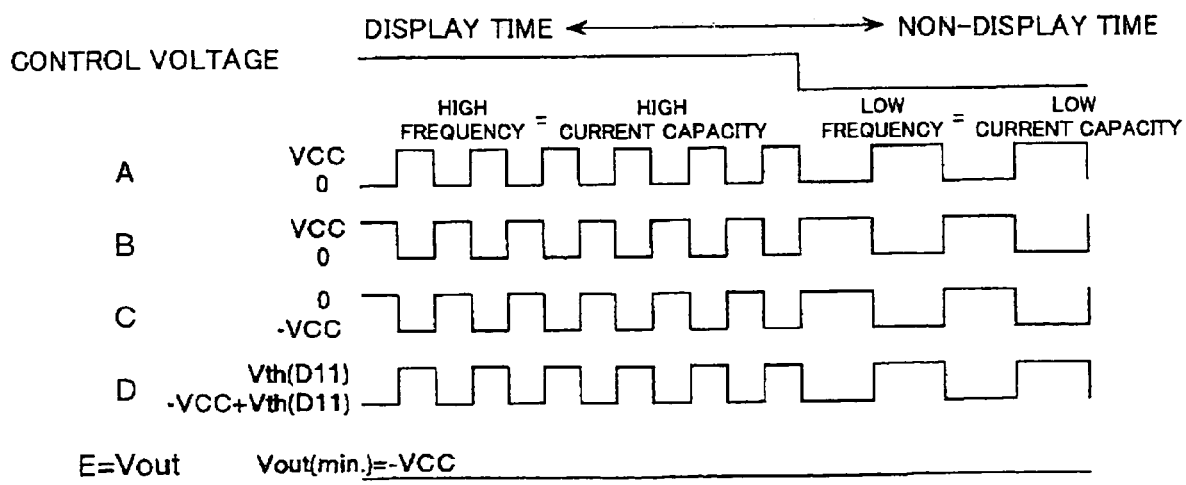
FIG. 28 is a timing chart of assistance in explaining circuit operation of the charge pump type DD converter of the negative voltage generating type according to the fourth practical application example.

Circuit operation of the thus formed charge pump type power supply voltage converting circuit of the negative voltage generating type according to the fourth practical application example will next be described with reference to a timing chart of FIG. 28. Waveforms A to E in the timing chart represent signal waveforms at nodes A to E, respectively, in the circuit of FIG. 27.

First, in the normal mode, by being supplied with the control voltage at the "H" level from the partial mode control circuit 26', the VCO 52 generates the first clock pulse of the predetermined frequency. The first clock pulse is supplied as a switching pulse to the gate common connection point of the CMOS inverter 11. In this case, an output potential of a capacitor C13, that is, a potential of the node D based on the switching pulse is clamped by a diode D11.

When the switching pulse is at an "L" level (0 V), Pch MOS transistors Qp11 and Qp12 are in an on state, and therefore a capacitor C11 is charged. In this case, an Nch MOS transistor Qn11 is in an off state, and therefore a potential of the node B is at a VCC level. Then, when the switching pulse is at an "H" level (VCC), the Nch MOS transistor Qn11 and an Nch MOS transistor Qn12 are in an on state, and the potential of the node B is at a ground level (0 V), so that a potential of the node C is at a −VCC level. The potential of the node C is passed through the Nch MOS transistor Qn12 as it is, and then becomes an output voltage Vout (=−VCC).

Next, when the partial mode (partial screen display mode) is set, the partial mode control circuit 26' outputs the control voltage at the "L" level during a period of a non-display area of the screen on the basis of externally supplied information specifying a position of a partial display area and the number of lines. By being supplied with the control voltage at the "L" level, the VCO 52 generates the second clock pulse of the frequency lower than that of the first clock pulse in the normal mode. The second clock pulse is supplied as a switching pulse to the gate common connection point of the CMOS inverter 11.

Thereafter, on the same operating principles as in the normal mode, DC-to-DC conversion operation is performed by pumping operation of the charge pump circuit based on the second clock pulse, and a negative voltage of −VCC is derived as the output voltage Vout. In this case, since the frequency of the switching pulse is lower than in the normal mode, the current supply capacity (current capacity) of the present DD converter is reduced. Specifically, as described above, the current supply capacity of the charge pump circuit is in inverse proportion to the frequency of the switching pulse and capacitance of the capacitor C11. Thus, lowering the frequency of the switching pulse reduces the current supply capacity.

As described above, the power supply circuit 25 formed by the charge pump type DD converter uses the VCO 52 as a source for generating the switching pulse, and makes the frequency of the switching pulse lower than in the normal mode to thereby reduce the current supply capacity of the power supply circuit 25 during most of the period of a non-display area. Thus, an unnecessary through current can be prevented from flowing through the charge pump circuit during the non-display period when the driver system consumes less current, whereby power consumption of the power supply circuit 25 can be reduced. In addition, the reduction of the power consumption of the power supply circuit improves conversion efficiency.

Figure 29:
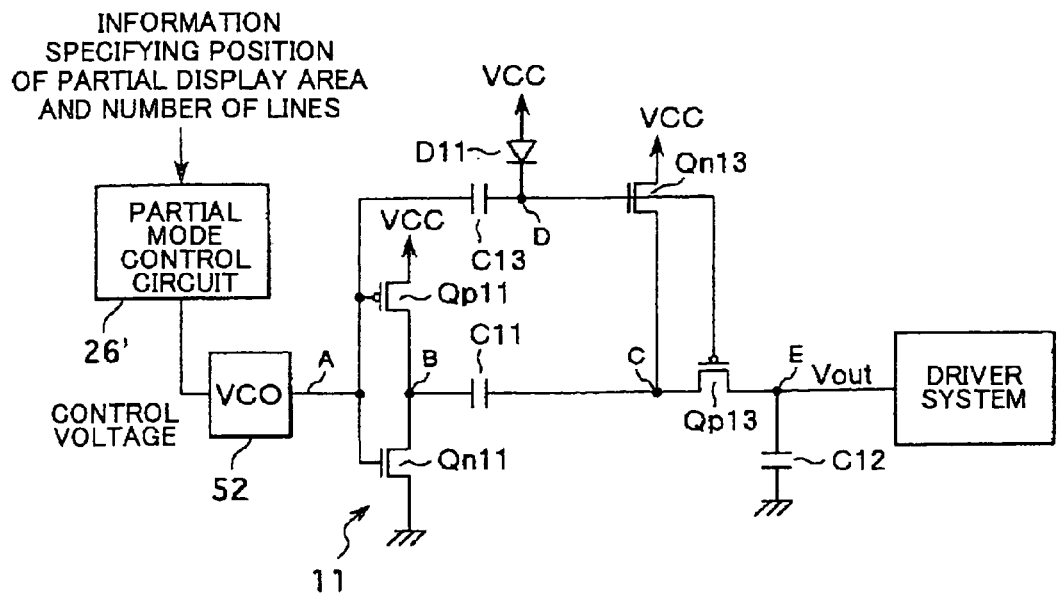
FIG. 29 is a circuit diagram showing a configuration of a charge pump type DD converter of the voltage raising type according to the fourth practical application example.

FIG. 29 shows a configuration of a charge pump type DD converter of a voltage raising type according to the fourth practical application example. Fundamental circuit configuration and circuit operation of the DD converter of the voltage raising type are the same as those of the DD converter of the negative voltage generating type.

Specifically, in FIG. 29, switching transistors (MOS transistors Qp13 and Qn13) are of an opposite conduction type from the MOS transistors Qn12 and Qp12 in the circuit of FIG. 27; and a diode D11 is connected between another end of a capacitor C11 and a power supply (VCC). The circuit of FIG. 29 is, different in configuration from the circuit of FIG. 27 only in that respect.

Figure 30:
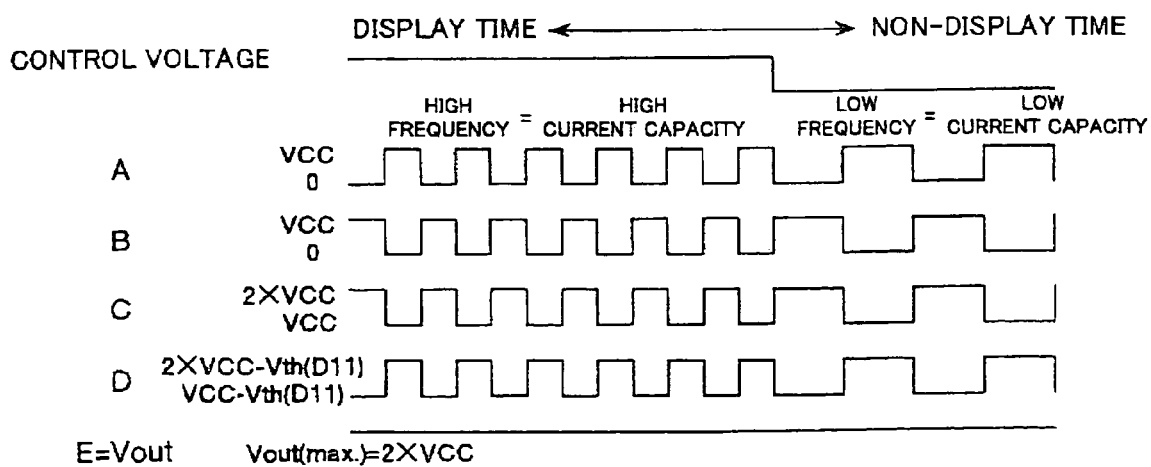
FIG. 30 is a timing chart of assistance in explaining circuit operation of the charge pump type DD converter of the voltage raising type according to the fourth practical application example.

The fundamental circuit operation of the circuit of FIG. 29 is also exactly the same as that of the circuit of FIG. 27. The circuit operation of the circuit of FIG. 29 is different from that of the circuit of FIG. 27 only in that a voltage value 2×VCC, twice the power supply voltage VCC, is derived as an output voltage Vout. FIG. 30 is a timing chart of signal waveforms A to E at nodes A to E, respectively, in the circuit of FIG. 29.

The circuit configurations of the charge pump circuits used as the fundamental circuit of the charge pump type DD converters according to the third and fourth practical application examples as described above are taken only as an example; the circuit configurations of the charge pump circuits are susceptible of various changes, and are not limited to the above circuit configuration examples.

Figure 31:
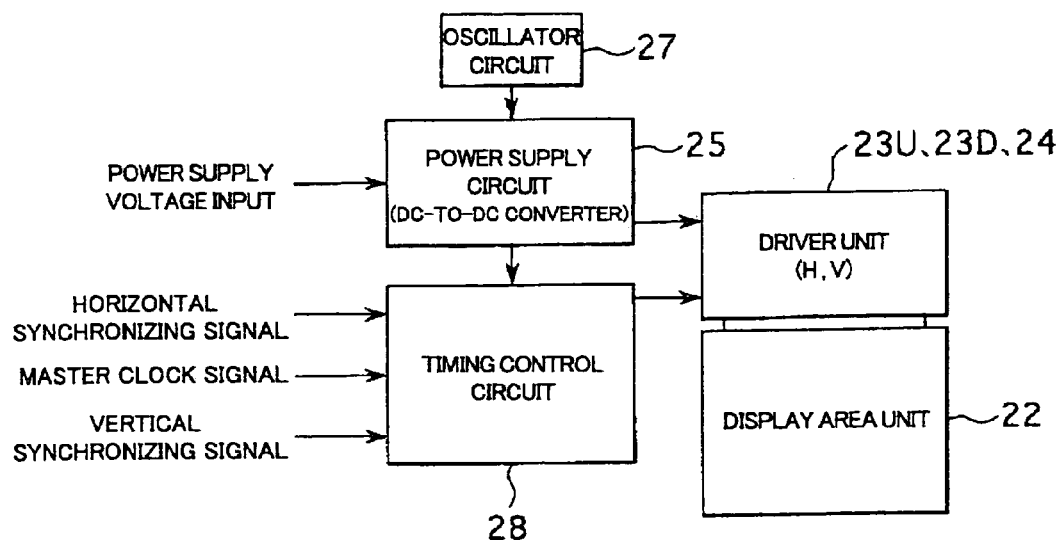
FIG. 31 is a block diagram illustrating an example of supplying a switching pulse to a power supply circuit formed by a charge pump type DD converter.

Typical methods of supplying a switching pulse to a power supply circuit 25 in a display apparatus having the power supply circuit 25 formed by a charge pump type DD converter include the following two methods. One of the methods uses an oscillator circuit 27 (corresponding to the pulse generating source 12 in FIG. 9), and uses a clock pulse generated by the oscillator circuit 27 as a switching pulse for the power supply circuit 25, as described thus far (see FIG. 31). Direct-current voltage obtained by DC-to-DC conversion by the power supply circuit 25 is supplied to a driver unit (23U, 23D, and 24) and a timing control circuit 28.

Figure 32:
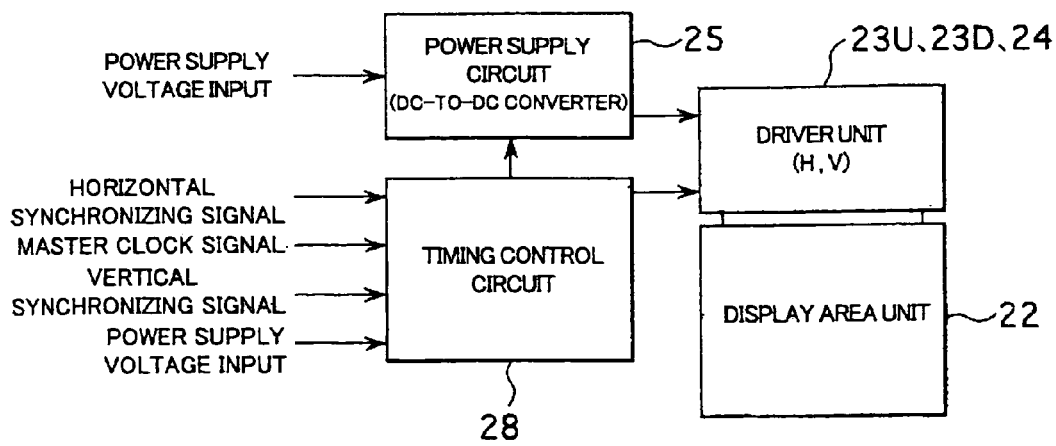
FIG. 32 is a block diagram illustrating another example of supplying a switching pulse to a power supply circuit formed by a charge pump type DD converter.

The other method uses a horizontal transfer clock, which is one of various timing signals generated by the timing control circuit 28, as a switching pulse for the power supply circuit 25 (see FIG. 32). The horizontal transfer clock is a clock signal used for circuit operation of a horizontal driving system (23U and 23D) within the driver unit.

The former of the two methods has an advantage in that the clock signal used for operation of the power supply circuit 25 does not need to be taken in externally, so that the power supply circuit 25 operates in a stable manner even when a master clock signal is interrupted in the power saving mode or the like. On the other hand, the method increases circuit area by an amount corresponding to provision of the oscillator circuit 25, and since synchronization between an oscillating clock of the oscillator circuit 25 and a video signal displayed on the display area unit 22 cannot be obtained, the method may cause noise and hence disturbance in the image and the like.

On the other hand, the latter method has advantages of being able to reduce circuit area by an amount corresponding to omission of the oscillator circuit 27 and reduce disturbance in an image and the like resulting from noise. However, since the power supply circuit 25 needs to operate at all times and hence the horizontal transfer clock cannot be stopped, the master clock signal serving as a basis for the horizontal transfer clock cannot be stopped in the power saving mode and the like, thus making it impossible to realize an effective low power consumption mode.

[Second Application Example]

Figure 33:
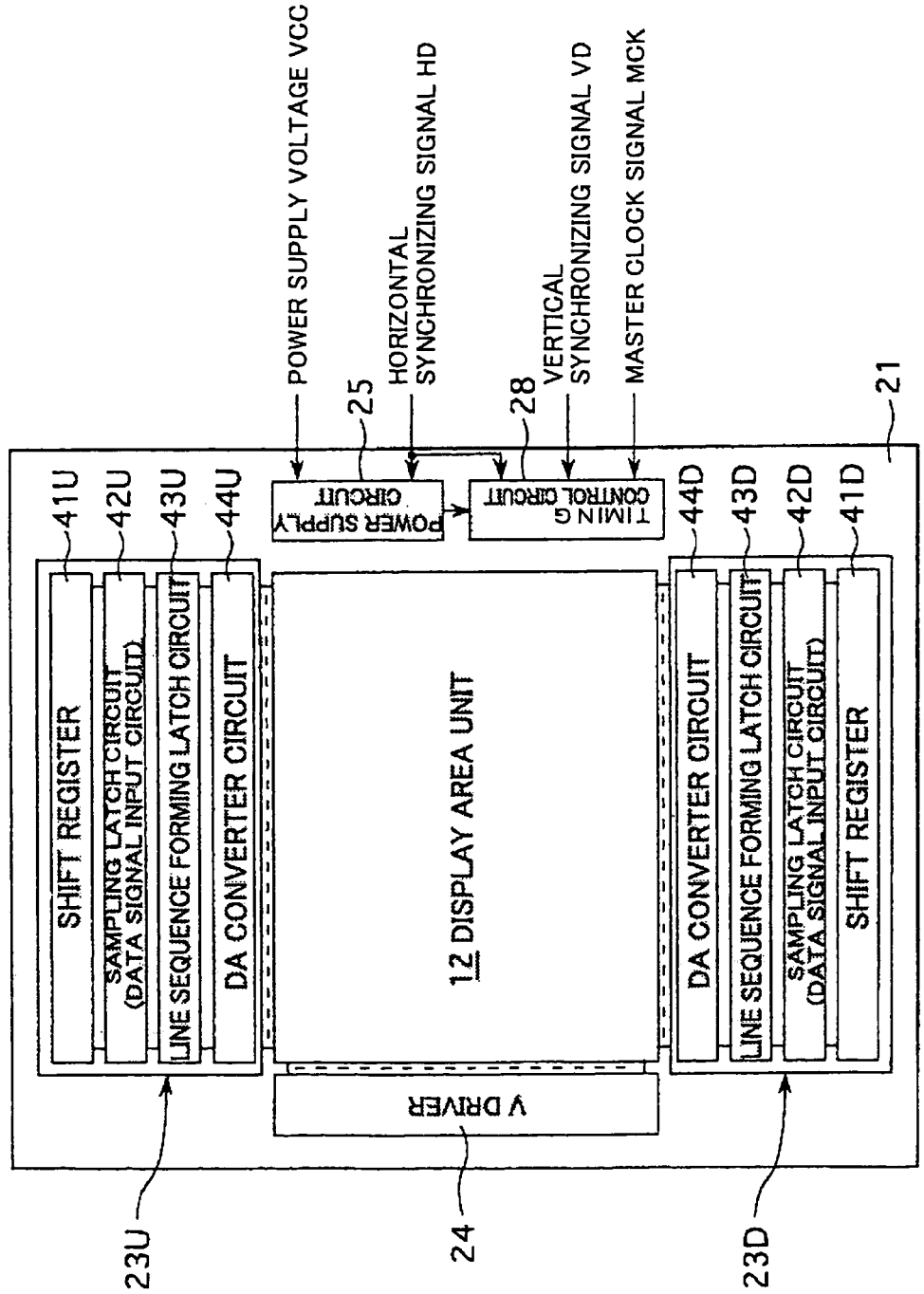
FIG. 33 is a block diagram showing an example of configuration of an active matrix type liquid crystal display apparatus according to a second application example.

Provided in view of the above is a display apparatus, for example an active matrix type liquid crystal display apparatus according to a second application example to be described below. FIG. 33 is a schematic block diagram showing an example of configuration of the active matrix type liquid crystal display apparatus according to the second application example of the present invention. In the figure, the same parts as in FIG. 15 are identified by the same reference numerals.

The active matrix type liquid crystal display apparatus according to the second application example is configured such that a synchronizing signal, for example a horizontal synchronizing signal HD in synchronism with a video signal displayed on a display area unit 12 is used as a switching pulse of a power supply circuit 25 formed by a charge pump type DD converter, and such that a timing control circuit 28 is integrated on the same glass substrate 21 of the display area unit 22. The other configuration of the active matrix type liquid crystal display apparatus according to the second application example is basically the same as that of the active matrix type liquid crystal display apparatus according to the first application example.

The timing control circuit 28 generates various timing signals for use by H drivers 23U and 23D and a V driver 24 on the basis of the horizontal synchronizing signal HD, a vertical synchronizing signal VD, and a master clock signal MCK that are supplied externally. For example, the timing control circuit 28 supplies a horizontal start pulse HST and a horizontal transfer clock HCK to the H drivers 23U and 23D, and supplies a vertical start pulse VST and a vertical transfer clock VCK to the V driver 24.

The use of the synchronizing signal, for example the horizontal synchronizing signal HD in synchronism with a video signal as a clock signal serving as a basis for switching operation of the power supply circuit 25 formed by a charge pump type DD converter in the active matrix type liquid crystal display apparatus provides the following effects. A circuit for generating the clock signal does not need to be newly provided, because the horizontal synchronizing signal HD is originally used by the timing control circuit 28. Therefore, area of the circuits formed on the glass substrate 21 can be reduced. This results in a smaller and thinner liquid crystal display apparatus.

In addition, the horizontal synchronizing signal HD is a result of synchronization separation by an external synchronization separator circuit (not shown), for example, from the video signal displayed on the display area unit 22, and hence the horizontal synchronizing signal HD is of course in synchronism with the video signal. Therefore, noise due to non-synchronization between the clock signal and the video signal does not occur, and hence the problem of disturbance in the image or the like due to the noise is not presented. Thus, it is possible to provide a liquid crystal display apparatus having an excellent picture quality.

It is to be noted that while the horizontal synchronizing signal HD is used in the second application example as a signal in synchronism with the video signal, the second application example is not limited to this. The vertical synchronizing signal VD, a signal obtained by frequency division of the horizontal synchronizing signal HD or the vertical synchronizing signal VD and the like can be used to provide the same effects as described above because any of the signals is in synchronism with the video signal. As a power supply voltage of the timing control circuit 28, a direct-current voltage generated by the power supply circuit 25 can be used, but a power supply voltage directly inputted externally may be used.

(Fifth Practical Application Example of DD Converter)

Figure 34:
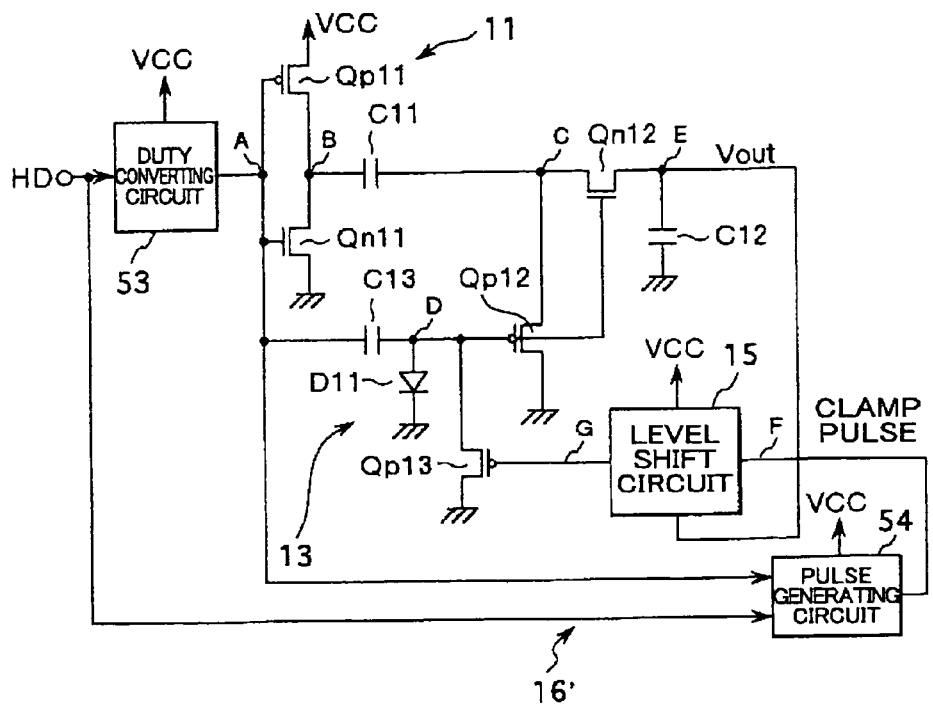
FIG. 34 is a circuit diagram showing a configuration of a charge pump type DD converter of the negative voltage generating type according to a fifth practical application example.

FIG. 34 is a circuit diagram showing a fifth practical application example of a charge pump type DD converter of a negative voltage generating type. In the figure, the same parts as in FIG. 9 are identified by the same reference numerals. A horizontal synchronizing signal HD, for example, is supplied as a clock signal to the charge pump type DD converter according to the fifth practical application example. The horizontal synchronizing signal HD is inputted to a duty converting circuit 53 and a pulse generating circuit 54.

The duty converting circuit 53 is configured by a frequency dividing circuit, for example, and converts the horizontal synchronizing signal HD into a clock pulse having a duty ratio of substantially 50%. The clock pulse obtained by the duty conversion of the duty converting circuit 53 is supplied as a switching pulse to a gate common connection point of a CMOS inverter 11 and also supplied to the pulse generating circuit 54. The pulse generating circuit 54 forms a second clamp circuit 16' in conjunction with a Pch MOS transistor Qp13 and a level shift circuit 15.

The pulse generating circuit 54 in the second clamp circuit 16' generates a clamp pulse on the basis of the horizontal synchronizing signal HD and the clock pulse obtained by the duty conversion of the horizontal synchronizing signal HD by the duty converting circuit 53. The clamp pulse is applied to a gate of the Pch MOS transistor Qp13 via the level shift circuit 15.

Figure 35:
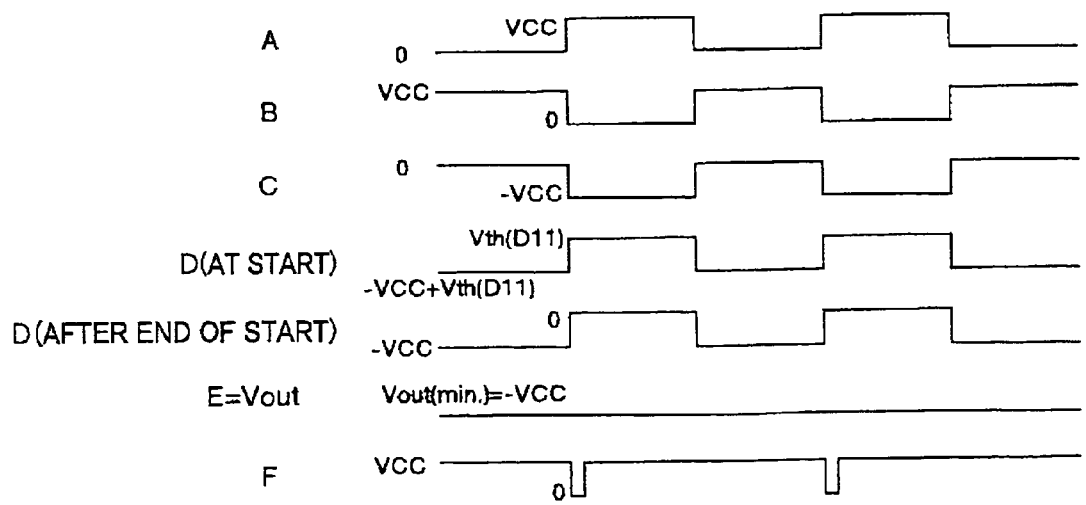
FIG. 35 is a timing chart of assistance in explaining circuit operation of the charge pump type DD converter of the negative voltage generating type according to the fifth practical application example.

Circuit operation of the thus formed charge pump type DD converter of the negative voltage generating type according to the fifth practical application example will next be described with reference to a timing chart of FIG. 35. Waveforms A to G in the timing chart represent signal waveforms at nodes A to G, respectively, in the circuit of FIG. 34.

At the time of turning on power (at the time of a start), a diode D11 first "H"-level-clamps an output potential of a capacitor C13, that is, a potential of the node D based on the clock pulse (switching pulse) obtained by the duty conversion of the horizontal synchronizing signal HD by the duty converting circuit 53 to a potential obtained by a level shift by a threshold voltage Vth of the diode D11 from a ground (GND) level, or a potential of a negative side circuit power supply.

When the switching pulse is at an "L" level (0 V), Pch MOS transistors Qp11 and Qp12 are in an on state, and therefore a capacitor C11 is charged. In this case, an Nch MOS transistor Qn11 is in an off state, and therefore a potential of the node B is at a VCC level. Then, when the switching pulse is at an "H" level (VCC), the Nch MOS transistor Qn11 and an Nch MOS transistor Qn12 are in an on state, and the potential of the node B is at the ground level (0 V), so that a potential of the node C is at a −VCC level. The potential of the node C is passed through the Nch MOS transistor Qn12 as it is, and then becomes an output voltage Vout (=−VCC).

Next, when the output voltage Vout rises to a certain degree (at the time of an end of the starting process), the level shift circuit 15 for the clamp pulse begins to operate. When the level shift circuit 15 begins to operate, the level shift circuit 15 shifts level of the clamp pulse of amplitude VCC−0 [V] generated by the pulse generating circuit 54 to that of a clamp pulse of amplitude VCC−Vout [V], and thereafter applies the clamp pulse to the gate of the Pch MOS transistor Qp13.

In this case, since the "L" level of the clamp pulse is the output voltage Vout, that is, −VCC, the Pch MOS transistor Qp13 is reliably brought into an on state. Thus, the potential of the node D is clamped at the ground level (negative side circuit power supply potential) rather than the potential obtained by the level shift by the threshold voltage Vth of the diode D11 from the ground level. Thus, in subsequent pumping operation, a sufficient driving voltage is provided for the Pch MOS transistor Qp12 in particular.

As described above, the power supply circuit 25 formed by the charge pump type DD converter uses the horizontal synchronizing signal HD as a signal serving as a basis for the switching pulse, and is provided in an input stage thereof with the duty converting circuit 53 so that the duty converting circuit 53 brings the duty ratio of the switching pulse close to 50%. Thus, it is possible to perform more efficient DC-to-DC conversion operation than when the horizontal synchronizing signal HD is used as it is as the switching pulse.

Figure 36:
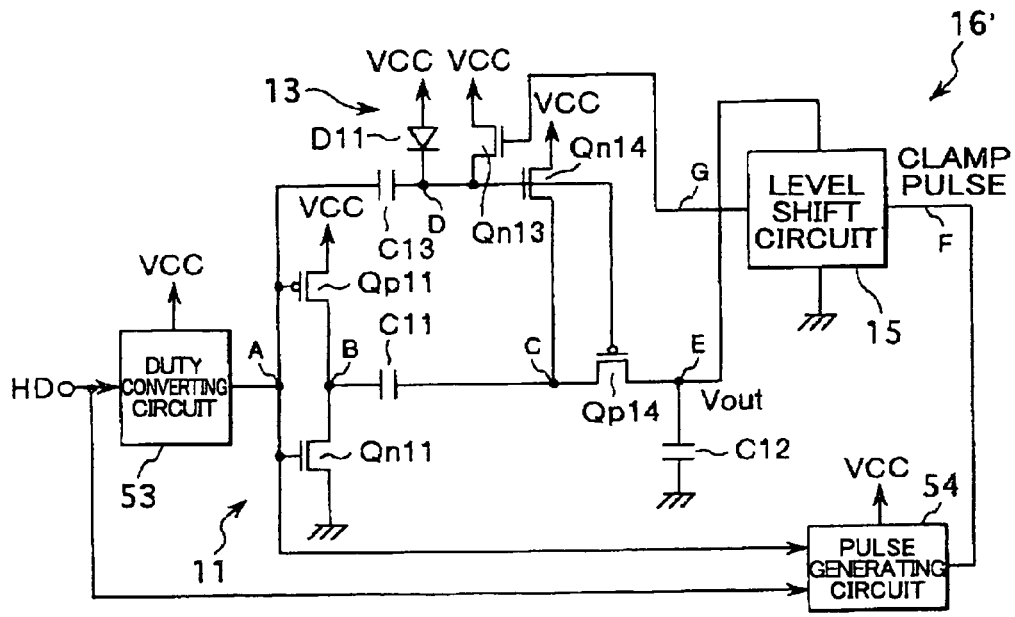
FIG. 36 is a circuit diagram showing a configuration of a charge pump type DD converter of the voltage raising type according to the fifth practical application example.
Figure 37:
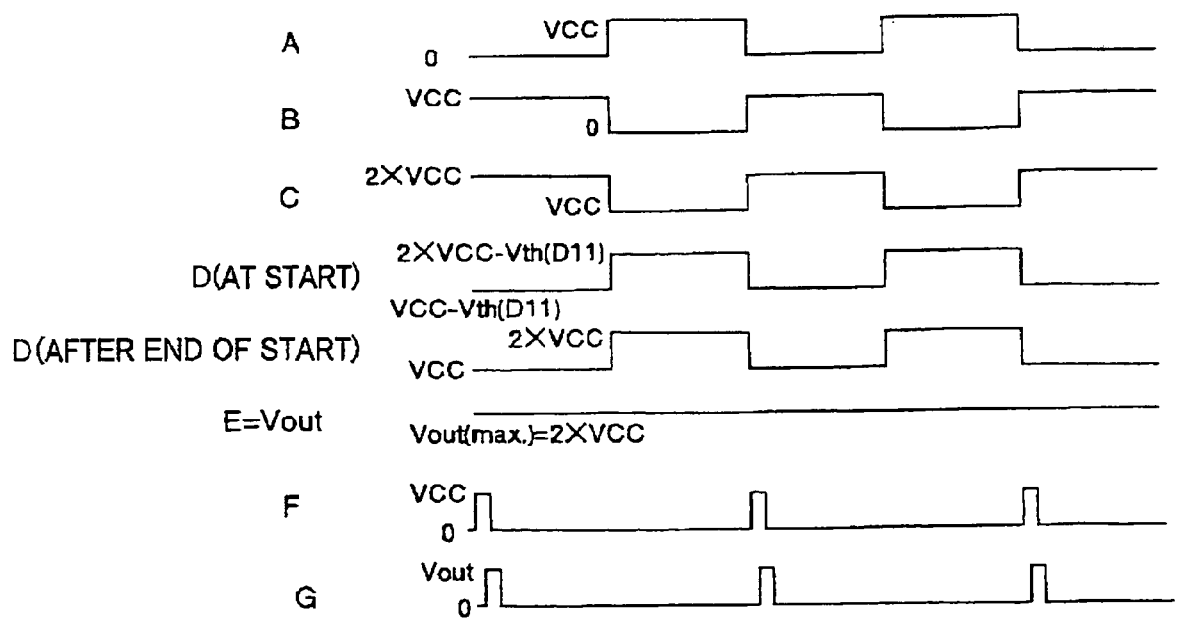
FIG. 37 is a timing chart of assistance in explaining circuit operation of the charge pump type DD converter of the voltage raising type according to the fifth practical application example.

FIG. 36 shows a configuration of a charge pump type DD converter of a voltage raising type according to the fifth practical application example. Fundamental circuit configuration and circuit operation of the DD converter of the voltage raising type are the same as those of the DD converter of the negative voltage generating type shown in FIG. 34.

Specifically, in FIG. 36, switching transistors and a clamp transistor (MOS transistors Qp14, Qn14, and Qn13) are of an opposite conduction type from the MOS transistors Qn12, Qp12, and Qp13 in the circuit of FIG. 34; a diode D11 is connected between another end of a capacitor C11 and a power supply (VCC); and a level shift circuit 15 is configured to use an output voltage Vout of the present circuit as a positive side circuit power supply and a ground level as a negative side circuit power supply. The circuit of FIG. 36 is different in configuration from the circuit of FIG. 34 only in that respect.

The fundamental circuit operation of the circuit of FIG. 36 is also exactly the same as that of the circuit of FIG. 34. The circuit operation of the circuit of FIG. 36 is different from that of the circuit of FIG. 34 only in that a switching pulse voltage (control pulse voltage) is first diode-clamped at the time of a start and clamped at a VCC level (positive side circuit power supply potential) at the time of an end of the start process, and a voltage value 2×VCC twice the power supply voltage VCC is derived as the output voltage Vout. FIG. 36 is a timing chart showing signal waveforms A to G at nodes A to G, respectively, in the circuit of FIG. 35.

It is to be noted that while the fifth practical application example uses the horizontal synchronizing signal HD as the signal serving as a basis for the switching pulse, the vertical synchronizing signal VD can also be used. Although frequencies of the horizontal synchronizing signal HD and the vertical synchronizing signal VD differ greatly from each other, the frequency difference can be dealt with by changing capacitance values of the capacitors C11 and C13.

The vertical transfer clock VCK generated by the timing control circuit 28 in FIG. 33 can also be used as the clock signal serving as a basis for switching operation. Since the vertical transfer clock VCK is a clock signal generated on the basis of the horizontal synchronizing signal HD and is in synchronism with a video signal, the vertical transfer clock VCK makes it possible to provide the same effects as the horizontal synchronizing signal HD and the vertical synchronizing signal VD. Furthermore, the vertical transfer clock VCK is inherently a clock signal with a duty ratio of 50%, and therefore the vertical transfer clock VCK eliminates the need for provision of the duty converting circuit 53, thus providing an advantage of being able to correspondingly reduce circuit area.

(Sixth Practical Application Example of DD Converter)

Figure 38:
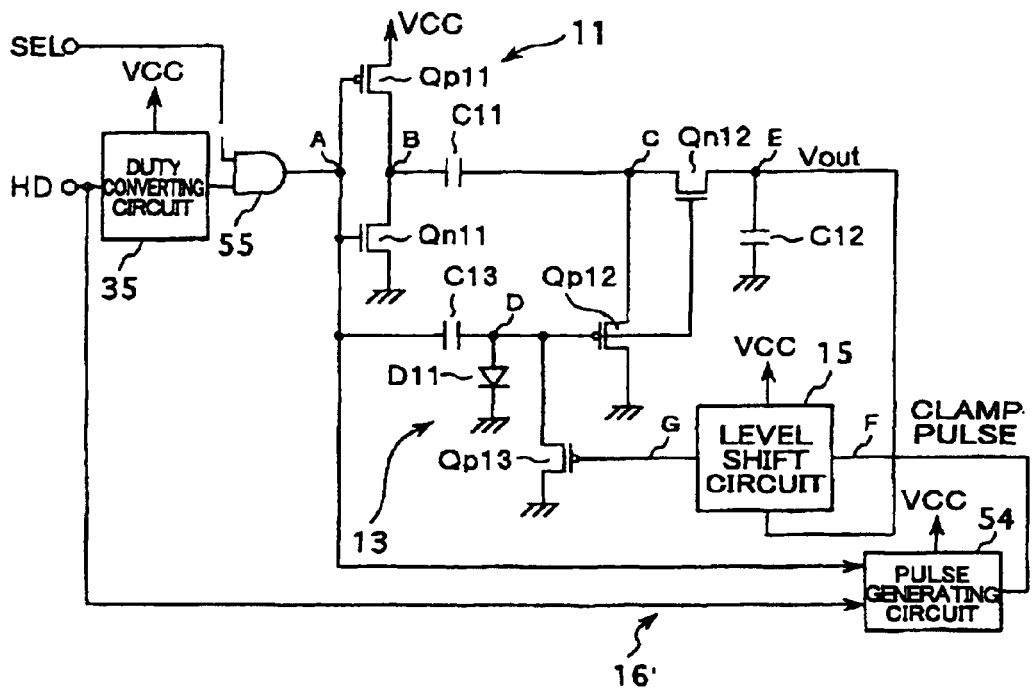
FIG. 38 is a circuit diagram showing a configuration of a charge pump type DD converter of the negative voltage generating type according to a sixth practical application example.

FIG. 38 is a circuit diagram showing a sixth practical application example of a charge pump type DD converter of a negative voltage generating type. In the figure, the same parts as in FIG. 34 are identified by the same reference numerals. The charge pump type DD converter according to the sixth practical application example is mounted on a liquid crystal display apparatus configured to selectively use the power saving mode to reduce power consumption of the apparatus as a whole, and uses the horizontal synchronizing signal HD, for example, as a reference clock signal for switching operation. It is to be noted that as in the case of the fifth practical application example, the vertical synchronizing signal VD, the vertical transfer clock VCK or the like may be used as the reference clock for switching operation.

The configuration of FIG. 38 is exactly the same as that of FIG. 34 except that a two-input AND circuit 55 is newly added in a stage succeeding a duty converting circuit 53. The two-input AND circuit 55 receives a clock pulse obtained by duty conversion of the horizontal synchronizing signal HD by the duty converting circuit 53 as one input, and receives a mode selection signal SEL at an "L" level supplied at the time of the power saving mode as the other input.

When the thus formed charge pump type DD converter according to the sixth practical application example is supplied with the mode selection signal SEL at the "L" level at the time of the power saving mode, the AND circuit 55 stops supplying the clock pulse based on the horizontal synchronizing signal HD to the interior of the circuit. This temporarily stops switching operation in the present DD converter (pumping operation of the charge pump). Therefore, current consumed within the DD converter is reduced, thus saving power. The same is true for a case where the horizontal synchronizing signal HD is inputted directly without converting the duty ratio of the horizontal synchronizing signal HD (the duty converting circuit 53 is omitted).

Thus, even when clock supply is temporarily stopped by setting the power saving mode, a control pulse (switching pulse) voltage for a switch device (Nch MOS transistor Qn12 and Pch MOS transistor Qp12) provided in an output unit is clamped in two separate stages at the time of a start and after an end of the start process, as described above. The clamped level at a node D is thereby stabilized. Therefore, it is possible to secure a sufficient current capacity even in a period of transition to a clock supply/stop, and thus it is possible to perform stable DC-to-DC conversion operation.

Figure 39:
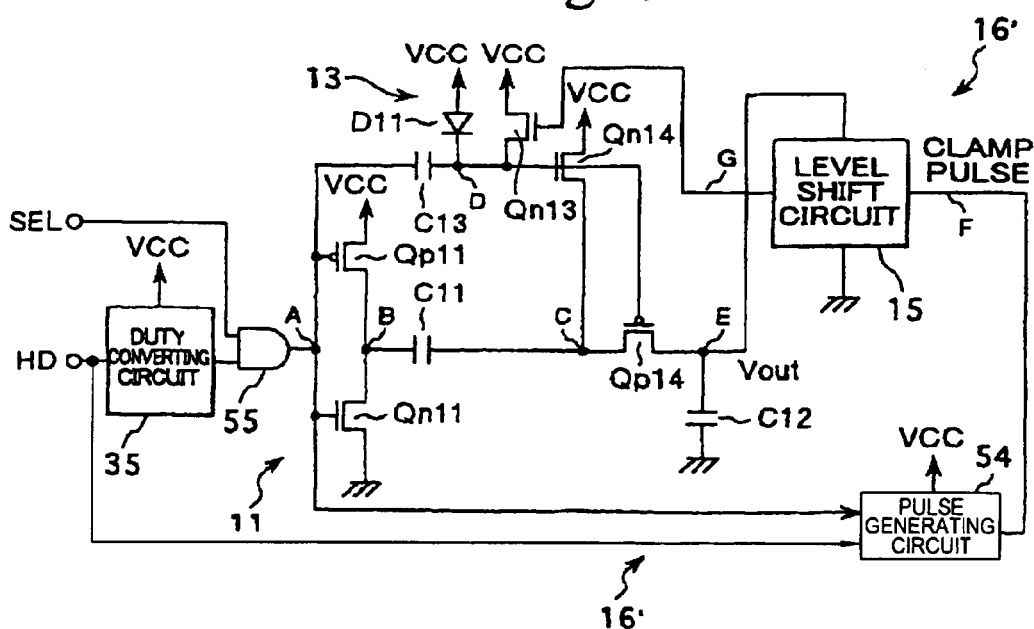
FIG. 39 is a circuit diagram showing a configuration of a charge pump type DD converter of the voltage raising type according to the sixth practical application example.

FIG. 39 shows a configuration of a charge pump type DD converter of a voltage raising type according to the sixth practical application example. Fundamental circuit configuration and circuit operation of the DD converter of the voltage raising type are the same as those of the DD converter of the negative voltage generating type shown in FIG. 38.

(Seventh Practical Application Example of DD Converter)

Figure 40:
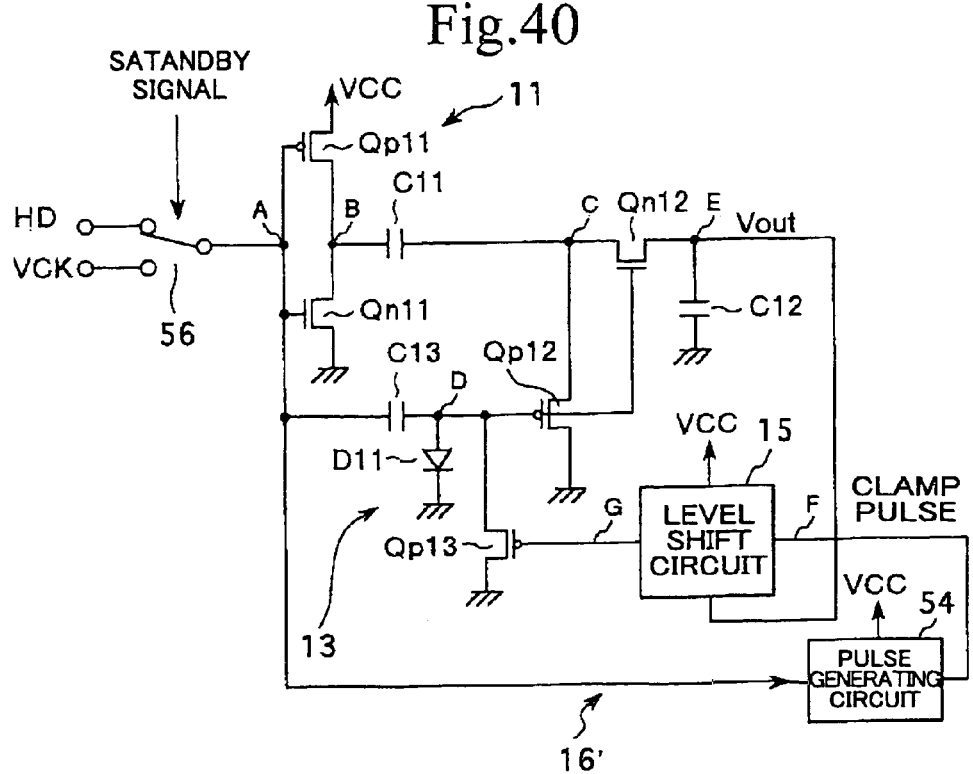
FIG. 40 is a circuit diagram showing a configuration of a charge pump type DD converter of the negative voltage generating type according to a seventh practical application example.

FIG. 40 is a circuit diagram showing a seventh practical application example of a charge pump type DD converter of a negative voltage generating type. In the figure, the same parts as in FIG. 34 are identified by the same reference numerals. The charge pump type DD converter according to the seventh practical application example is configured to use both the horizontal synchronizing signal HD (or the vertical synchronizing signal VD) and the vertical transfer clock VCK as a reference clock signal for switching operation.

The configuration of FIG. 40 is exactly the same as that of FIG. 34 except that a selector switch 56 in an input stage of the horizontal synchronizing signal HD/vertical transfer clock VCK is provided in place of the duty converting circuit 53. The selector switch 56 receives the horizontal synchronizing signal HD and the vertical transfer clock VCK as two inputs, and selects the inputs on the basis of a standby signal supplied during a standby period. The standby period is a period from when power is turned on to when the other circuits, that is, the H drivers 23U and 23D, the V driver 24, and the timing control circuit 28 shown in FIG. 33 begin to operate.

In the thus formed charge pump type DD converter according to the seventh practical application example, the selector switch 56 selects the horizontal synchronizing signal HD in response to the standby signal during the standby period. During the standby period, the H drivers 23U and 23D, the V driver 24, and the timing control circuit 28 are controlled by the standby signal so as to consume current as little as possible. Thus, power consumption is reduced.

On the other hand, when the selector switch 56 selects the horizontal synchronizing signal HD, the power supply circuit 25, that is, the present DD converter performs switching operation using the horizontal synchronizing signal HD as an operating clock to generate a direct-current voltage of a predetermined voltage value (−VCC and 2 VCC in the seventh example; however, −VCC and 2 VCC are a mere example). The direct-current voltages are supplied to the H drivers 23U and 23D, the V driver 24, and the timing control circuit 28 as power supply voltage.

Thus, the timing control circuit 28 generates the vertical transfer clock VCK on the basis of the horizontal synchronizing signal HD. The vertical transfer clock VCK is selected in place of the horizontal synchronizing signal HD by the selector switch 56 after an end of a certain period from the turning on of power, that is, after an end of the standby period. Then, the present DD converter performs switching operation using the vertical transfer clock VCK as an operating clock to continue DC-to-DC conversion operation.

Thus, switching operation is performed using the horizontal synchronizing signal HD as an operating clock at the time of turning on power, and switching operation is performed using the vertical transfer clock VCK as an operating clock after an end of the standby period. Therefore, even when current consumption is increased after the end of the standby period, it is possible to perform efficient DC-to-DC conversion operation based on the vertical transfer clock VCK with a duty ratio of 50%, and thus obtain a sufficient current capacity.

Figure 41:
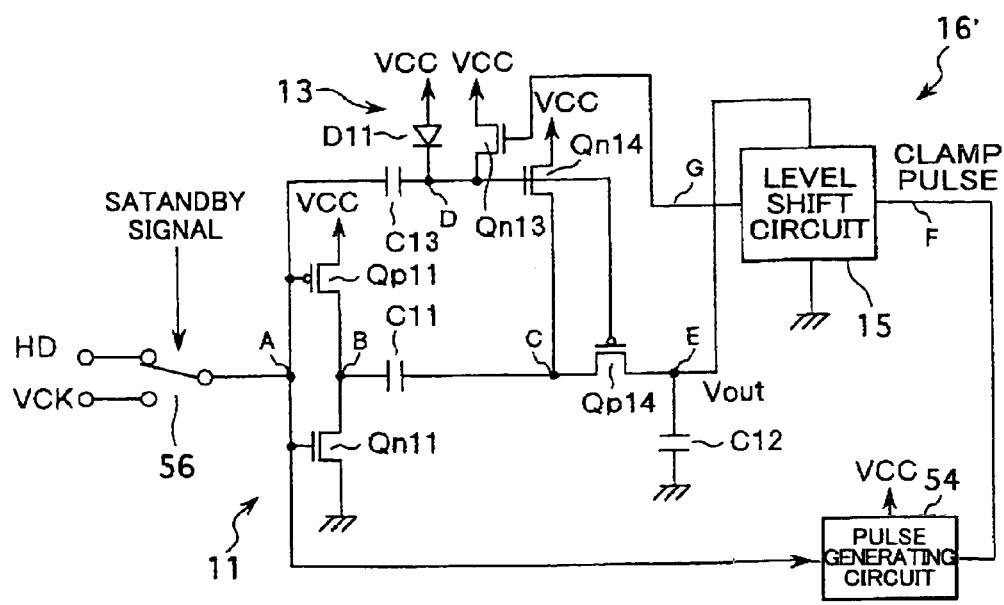
FIG. 41 is a circuit diagram showing a configuration of a charge pump type DD converter of the voltage raising type according to the seventh practical application example.

FIG. 41 shows a configuration of a charge pump type DD converter of a voltage raising type according to the seventh practical application example. Fundamental circuit configuration and circuit operation of the DD converter of the voltage raising type are the same as those of the DD converter of the negative voltage generating type shown in FIG. 40.

The charge pump type DD converters according to the fifth to seventh practical application examples have been described above by taking as an example a case where the charge pump circuits use a configuration in which control pulse (switching pulse) voltage for the switch device (Nch MOS transistor Qn12 and Pch MOS transistor Qp12) is clamped in two separate stages, for example first clamped by the diode D11 of the first clamp circuit 13 at the time of starting and then clamped by the second clamp circuit 16' after an end of the starting process. However, this circuit configuration is a mere example; the circuit configuration of the charge pump circuits is susceptible of various changes, and is not limited to the above example of the circuit configuration.

While the first and second application examples have been described by taking as an example a case where the charge pump type DD converters are applied to an active matrix type liquid crystal display apparatus, the present invention is not limited to this. The charge pump type DD converters are similarly applicable to other active matrix type display apparatus such as an EL display apparatus using an electroluminescence (EL) device as an electrooptic device of each pixel.

The display apparatus according to the present invention are suitable for use as a display of office automation equipment such as personal computers, word processors and the like, television receivers and the like, and are suitable especially for use as a display unit of portable terminals such as portable telephones, PDAs and the like whose apparatus body has been made smaller and more compact.

Figure 42:
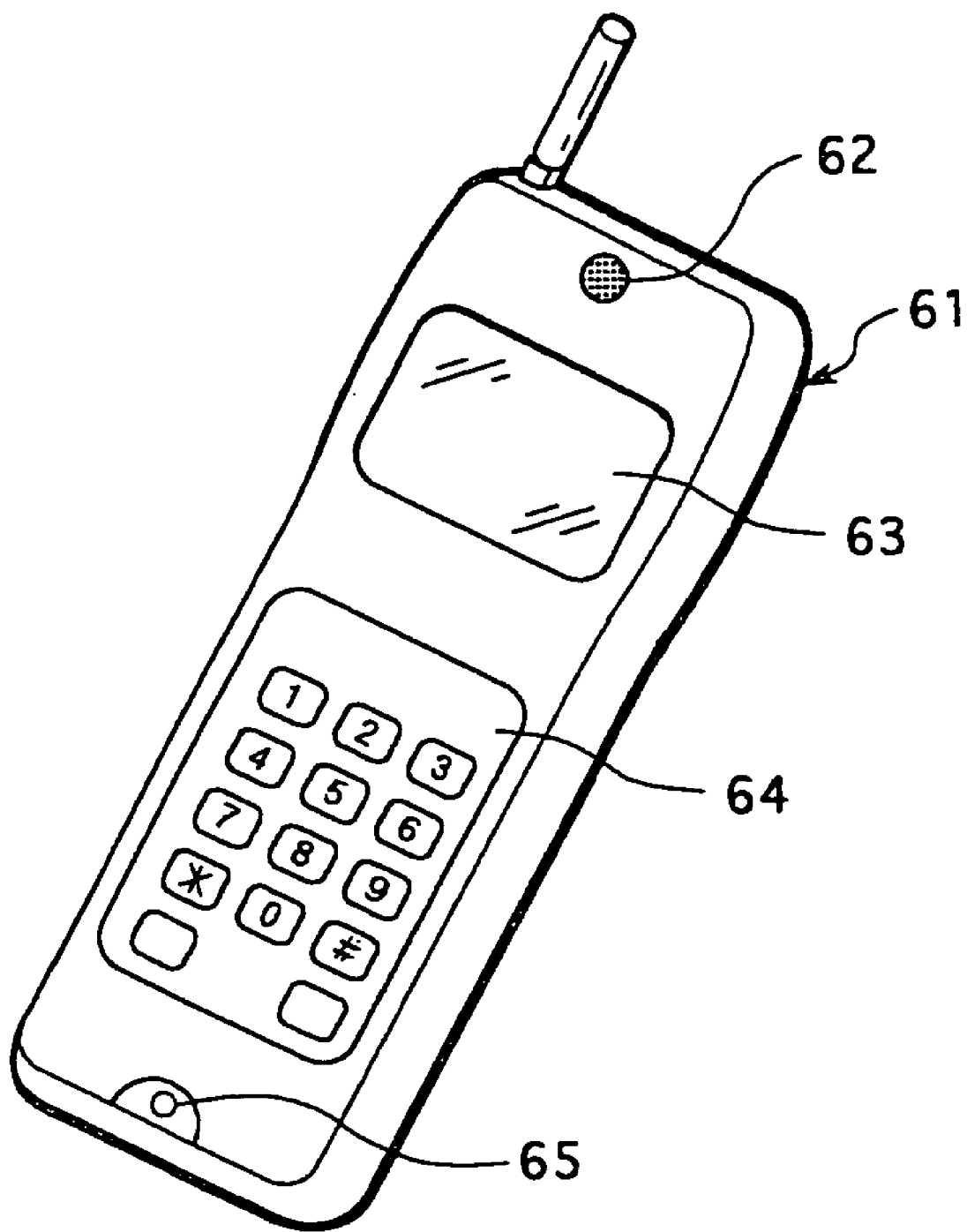
FIG. 42 is a schematic external view of configuration of a portable telephone, or a portable terminal according to the present invention.

FIG. 42 is a schematic external view of configuration of a portable terminal, for example a portable telephone to which the present invention is applied.

The portable telephone according to this example has a speaker unit 62, an output display unit 63, a control unit 64, and a microphone unit 65 arranged in that order from the top down on the front side of an apparatus casing 61. In the thus formed portable telephone, a liquid crystal display apparatus, for example, is used as the output display unit 63. As the liquid crystal display apparatus, an active matrix type liquid crystal display apparatus formed by integrating a power supply circuit formed by the charge pump type DD converters according to the foregoing embodiments or the first to seventh practical application examples thereof on the same substrate of the display area unit is used.

Thus, a portable terminal such as a portable telephone uses as the output display unit 63 the active matrix type liquid crystal display apparatus mounted with the power supply circuits formed by the charge pump type DD converters according to the foregoing embodiments or the first and second practical application examples thereof. Thus, the power supply circuits can obtain a high current capacity on a small-area circuit scale. The power supply circuits therefore have an advantage of being able to contribute greatly to reducing power consumption of the portable terminal, and further making the apparatus body smaller and more compact.

In addition, by using active matrix type liquid crystal display apparatus mounted with power supply circuits formed by the charge pump type DD converters according to the third and fourth practical application examples as the output display unit 63, it is possible to reduce power consumption in the power supply circuits with a reduction in the current supply capacity of the driver system at the time of the power saving mode. Therefore, power consumption can be further reduced in the power saving mode.

Furthermore, by using active matrix type liquid crystal display apparatus mounted with power supply circuits formed by the charge pump type DD converters according to the fifth to seventh practical application examples as the output display unit 63, it is possible to reduce size of the apparatus as a whole and reduce noise. It is therefore possible to reduce size of the body of the terminal and improve picture quality. At the time of the power saving mode, in particular, it is possible to reduce power consumption in the circuit system.

INDUSTRIAL APPLICABILITY

According to the present invention, in a power supply voltage converting circuit using a charge pump circuit having a switch device in an output unit, a control pulse voltage for the switch device is diode-clamped at the time of a start, and the control pulse voltage is clamped at a circuit power supply potential on the basis of a voltage outputted through the switch device at the time of an end of the start process. Therefore, it is possible to provide a sufficient driving voltage for the switch device, and thus perform stable DC-to-DC conversion operation. In addition, it is not necessary to increase size of the device, so that a power supply voltage converting circuit having a high current capacity can be realized on a small-area circuit scale.

The invention claimed is:

1. A power supply voltage converting circuit using a charge pump circuit having a switch device in an output unit, characterized by comprising:

a first clamp circuit for diode-clamping a control pulse voltage for said switch device at the time of a start; and a second clamp circuit for clamping said control pulse voltage at a circuit power supply potential on the basis of a voltage outputted through said switch device at the time of an end of the start process, said second clamp circuit characterized by comprising:

clamp pulse generating means for generating a clamp pulse using a value of the voltage outputted through said switch device; and a switching transistor connected between a node where said control pulse voltage is supplied and the circuit power supply potential for performing switching operation in synchronism with said clamp pulse.

2. A power supply voltage converting circuit as claimed in claim 1, wherein said switch device is a thin film transistor.

3. A power supply voltage converting circuit as claimed in claim 1, wherein said switch device and said switching transistor are a thin film transistor.

4. A power supply voltage converting circuit as claimed in claim 1, said clamp pulse generating means comprises a pulse generating source for generating a clamp pulse, and a level shift circuit for level-shifting a voltage value of said clamp pulse to the value of the voltage outputted through said switch device and then supplying said clamp pulse to said switching transistor.

* * * * *